(12) United States Patent
Kim et al.

(10) Patent No.: US 11,281,297 B2
(45) Date of Patent: Mar. 22, 2022

(54) METHOD OF GENERATING A TACTILE SIGNAL USING A HAPTIC DEVICE

(71) Applicant: CK MATERIALS LAB CO., LTD., Seoul (KR)

(72) Inventors: Hyeong Jun Kim, Seoul (KR); Ji Goo Kang, Seoul (KR); Jong Hun Lee, Seoul (KR); Jeong Beom Lee, Seoul (KR); Jong Hyung Jung, Seoul (KR)

(73) Assignee: CK MATERIALS LAB CO., LTD., Seoul (KR)

( * ) Notice: Subject to any disclaimer, the term of this patent is extended or adjusted under 35 U.S.C. 154(b) by 0 days.

(21) Appl. No.: 16/998,093

(22) Filed: Aug. 20, 2020

(65) Prior Publication Data

US 2020/0379571 A1 Dec. 3, 2020

Related U.S. Application Data

(62) Division of application No. 16/654,106, filed on Oct. 16, 2019, now Pat. No. 10,782,786, which is a
(Continued)

(30) Foreign Application Priority Data

May 17, 2016 (KR) .................. 10-2016-0060432
Oct. 21, 2016 (KR) .................. 10-2016-0137735

(51) Int. Cl.
*G06F 3/00* (2006.01)
*G06F 3/01* (2006.01)
(Continued)

(52) U.S. Cl.
CPC .............. *G06F 3/016* (2013.01); *A63F 13/24* (2014.09); *A63F 13/285* (2014.09);
(Continued)

(58) Field of Classification Search
CPC ..... G06F 3/016; G06F 3/01; G10H 2210/066;
G10H 2210/071; G10H 2210/076;
(Continued)

(56) References Cited

U.S. PATENT DOCUMENTS 4,250,637 A 2/1981 Scott
4,581,491 A 4/1986 Boothroyd
(Continued)

FOREIGN PATENT DOCUMENTS

EP 2846229 A2 3/2015
EP 2846229 A3 5/2015
(Continued)

OTHER PUBLICATIONS

International Search Report, issued for PCT/KR2017/005049, dated Aug. 10, 2017, 4 pages.
(Continued)

*Primary Examiner* — Ojiako K Nwugo
(74) *Attorney, Agent, or Firm* — Mayer & Williams, PC; Stuart H. Mayer

(57) ABSTRACT

A haptic device according to one embodiment can comprise: a database unit for storing acoustic information or receiving the acoustic information from an external device; a control unit for converting the acoustic information into an electrical signal according to a predetermined pattern; a driving unit for generating a motion signal on the basis of the electrical signal; and a transfer unit for transferring a patterned tactile signal to a user by means of the motion signal.

6 Claims, 36 Drawing Sheets

Related U.S. Application Data division of application No. 15/763,210, filed as application No. PCT/KR2017/005049 on May 16, 2017, now Pat. No. 10,488,929.

(51) Int. Cl.
    *A63F 13/285*     (2014.01)
    *A63F 13/424*     (2014.01)
    *A63F 13/24*     (2014.01)
    *G10H 1/00*     (2006.01)

(52) U.S. Cl.
    CPC .............. *A63F 13/424* (2014.09); *G06F 3/01* (2013.01); *G10H 1/0008* (2013.01); *G10H 2210/066* (2013.01); *G10H 2210/071* (2013.01); *G10H 2210/076* (2013.01)

(58) Field of Classification Search
    CPC ............ G10H 2220/311; G10H 1/0008; A63F 13/424; A63F 13/24; A63F 13/825
    See application file for complete search history.

(56) References Cited

U.S. PATENT DOCUMENTS

| | | | |
|---|---|---|---|
| 10,186,138 B2 * | 1/2019 | Moussette | G06F 3/016 |
| 2007/0097073 A1 | 5/2007 | Takashima | |
| 2007/0279401 A1 * | 12/2007 | Ramstein | G06F 3/016 |
| | | | 345/184 |
| 2011/0287393 A1 | 11/2011 | Rebolledo-Mendez | |
| 2012/0279380 A1 | 11/2012 | Ashdown | |
| 2014/0267076 A1 * | 9/2014 | Birnbaum | H01H 13/84 |
| | | | 345/173 |
| 2014/0292501 A1 | 10/2014 | Lim et al. | |
| 2014/0347177 A1 * | 11/2014 | Phan | H04N 21/4382 |
| | | | 340/407.1 |
| 2016/0027264 A1 | 1/2016 | Choi | |
| 2016/0063848 A1 * | 3/2016 | Moussette | G06F 3/016 |
| | | | 340/527 |
| 2016/0180661 A1 | 6/2016 | Ulrich | |
| 2016/0320842 A1 * | 11/2016 | Saboune | G06F 3/041 |
| 2016/0334871 A1 * | 11/2016 | Levesque | G06F 1/163 |
| 2017/0147067 A1 * | 5/2017 | Levesque | G06F 3/016 |
| 2017/0168571 A1 * | 6/2017 | Levesque | G06Q 30/02 |
| 2017/0194019 A1 * | 7/2017 | Derrick | G10L 25/93 |
| 2017/0336869 A1 | 11/2017 | Khoshikava | |

FOREIGN PATENT DOCUMENTS

| | | |
|---|---|---|
| EP | 2955609 A1 | 12/2015 |
| EP | 3379378 A1 | 9/2018 |
| JP | 2012-181867 | 9/2012 |
| KR | 2011-0118584 | 10/2011 |
| KR | 10-1084059 | 11/2011 |
| KR | 10-1391710 | 5/2014 |
| KR | 20140117958 A | 10/2014 |
| KR | 10-1468250 | 12/2014 |
| KR | 10-1550925 | 9/2015 |
| KR | 10-1603957 | 3/2016 |
| WO | 2003032289 A1 | 4/2003 |
| WO | 2017188507 A1 | 11/2017 |

OTHER PUBLICATIONS

Written Opinion, issued for PCT/KR2017/005049, dated Aug. 10, 2017, 4 pages.

* cited by examiner

FIG. 2

| Note name | Note | Rest name | Rest |
|---|---|---|---|
| Whole note |  | Whole rest |  |
| Half note |  | Half rest |  |
| Quarter note | 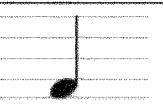 | Quarter rest | 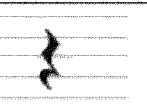 |
| Eighth note | 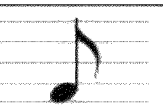 | Eighth rest | 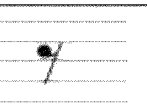 |
| Sixteenth note |  | Sixteenth rest | 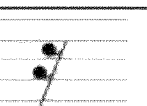 |
| Thirty-second note |  | Thirty-second rest | 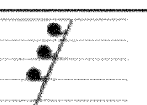 |

FIG. 3

| Type | 2 time | 3 time | 4 time | Characteristic |
|---|---|---|---|---|
| Simple time | $\frac{2}{2}, \frac{2}{4}$ | $\frac{3}{2}, \frac{3}{4}, \frac{3}{8}$ | $\frac{4}{2}, \frac{4}{4}, \frac{4}{8}$ | Use basic note as unit beat, and tie two notes as single unit |
| Compound time | $\frac{6}{4}, \frac{6}{8}$ | $\frac{9}{4}, \frac{9}{8}$ | $\frac{12}{4}, \frac{12}{8}$ | Use basic note or dotted note as unit beat, and tie three notes as single unit |
| Complex time | $\frac{5}{4}(\frac{2}{4}+\frac{3}{4}), \frac{5}{4}(\frac{3}{4}+\frac{4}{4}, \frac{4}{4}+\frac{3}{4})$ | | | |

FIG. 4

Andante grazioso (♪=120)

(Articulation)      (Tempo)

| *ppp* | – | *pp* | – | *p* | – | *mp* | – | *mf* | – | *f* | – | *ff* | – | *fff* |
|---|---|---|---|---|---|---|---|---|---|---|---|---|---|---|
| very very soft | | very soft | | soft | | moderately soft | | moderately loud | | loud | | very loud | | very very loud |
| Pianississsimo | | Pianissimo | | Piano | | Mezzo-piano | | Mezzo-forte | | forte | | fortissimo | | fortississmo |

Andante grazioso ($\flat$ = 120)
(Articulation)     (Tempo)

| *ppp*    –    *pp*    –    *p*    –    *mp*    –    *mf*    –    *f*    –    *ff*    –    *fff* |
|---|
| very very soft   very soft   soft   moderately soft   moderately loud   loud   very loud   very very loud |
| Pianississsimo   Pianissimo   Piano   Mezzo-piano   Mezzo-forte   forte   fortissimo   fortississmo |

| Tapping mode OR Rolling mode | General vibration mode |
|---|---|
| | |

METHOD OF GENERATING A TACTILE SIGNAL USING A HAPTIC DEVICE

TECHNICAL FIELD

Embodiments relate to a method of converting an acoustic signal into a tactile signal and a haptic device using the same.

BACKGROUND

A haptic device provides a tactile sense to a user by generating a vibration, a force, or an impulse in a digital device. That is, the haptic device provides a vibration, a motion, or a force to the user when the user controls an input device (for example, a joystick, a mouse, a keyboard, or a touch screen) of the digital device such as a game console, a mobile phone, or a computer. Thus, the haptic device transmits realistic information to the user, like computer virtual experience.

In general, haptic devices for haptic technology include an inertial actuator, a piezoelectric actuator, and an electro-active polymer actuator (EAP).

The inertial actuator includes an eccentric rotation motor (ERM) that vibrates using an eccentric force generated by a weight body connected to a magnetic circuit, and a linear resonant actuator (LRA) that maximizes an intensity of vibration using a resonant frequency generated by a weight body connected to a magnetic circuit and an elastic spring.

The piezoelectric actuator is a device that is driven in a form of a bar or a disk using an elastic body, around a piezoelectric device with a shape that instantaneously deforms by an electric field.

In relation to the piezoelectric actuator, among the existing haptic devices, there were published Korean Patent Publication No. 10-1603957 (entitled Piezoelectric Actuator, Piezoelectric Vibration Apparatus, and Portable Terminal), and Korean Patent Application Publication No. 10-2011-0118584 (entitled Transparent Composite Piezoelectric Combined Touch Sensor and Haptic Actuator).

The EAP is a device that is driven by providing repeated motions using an electro-active polymer film attached to a mass body, on the main principle that a shape thereof deforms by a functional group of a polymer backbone having a specific mechanism by external electric power.

Further, in addition to the above haptic devices, haptic devices using shape-memory alloys, electrostatic forces, or ultrasonic waves are being developed.

At an early stage of development, the haptic device was mainly applied to aircraft and fighter aircraft simulations, virtual reality experience films, and games. With the release of a touch screen mobile phone to which haptic technology is applied after the mid 2000's, the haptic technology has emerged and become familiar to individual users.

As described above, the haptic device is used in various electronic devices such as game consoles. Use of the haptic device is increasing in response to a growing user demand for accessing media using a complex method such as a tactile method or an olfactory method in addition to an audiovisual method.

In general, an existing haptic feedback providing method operates the haptic device in response to an event generated when a user controls a digital device, or an event generated in an application. That is, the haptic device is triggered by a predetermined event generated when the user interacts through a user interface of the digital device, or the event generated in the application (for example, an alarm). Like this, in general, an event-driven haptic feedback providing method that outputs a predefined predetermined haptic pattern in response to the generated event is used.

Another haptic feedback providing method provides a haptic feedback by continuously converting output audio data into data for haptic output. In this example, the output audio data is converted into the haptic data using an analog signal scheme or a fast Fourier transform (FFT) filter scheme.

The analog signal scheme drives a haptic actuator using an analog signal generated when outputting audio data as an input. The analog signal scheme has an overly fast response rate, is easily implemented as hardware, and is more effective for a case in which a driving frequency range of the actuator is varied.

SUMMARY

An aspect provides technology for providing a tactile sense appropriate for an acoustic effect output from various contents such as images, music, and games.

Another aspect provides technology for providing a more rhythmic and higher-dimensional tactile sense, rather than a simple vibration, by distinguishing a loudness and a pitch.

Still another aspect provides technology for efficiently patterning, as tactile senses, records such as a score in which an acoustic characteristic is written.

According to an aspect, there is provided a haptic device including a database configured to store acoustic information or receive the acoustic information from an external device, a controller configured to convert the acoustic information into an electrical signal corresponding to a predetermined pattern, and a tactile actuator configured to provide a user with a patterned tactile signal. The tactile actuator may include a driver configured to generate a motion signal based on the electrical signal, and a transmitter configured to transmit the patterned tactile signal to the user using the motion signal.

The acoustic information may include at least one of a note having duration information, pitch information, and loudness information, and a rest having duration information.

The electrical signal corresponding to the predetermined pattern may include a voltage magnitude that increases in proportion to the pitch information of the note, a voltage apply time that increases in proportion to the duration information of the note, and a waiting time arranged after the voltage apply time.

The voltage magnitude may have a predetermined value corresponding to a note having a different pitch.

The duration information of the note may be equal to a sum of the voltage apply time and the waiting time.

The acoustic information may further include a dynamic marking that changes the loudness information of the note, and the controller may be configured to adjust the voltage magnitude or the voltage apply time based on an indication indicated by the dynamic marking.

The controller may be configured to increase the voltage magnitude and/or the voltage apply time compared to the waiting time at a predetermined rate when the dynamic marking is a forte-type marking, and the controller may be configured to decrease the voltage magnitude and/or the voltage apply time compared to the waiting time at the predetermined rate when the dynamic marking is a piano-type marking.

The acoustic information may further include a slur that links notes of different pitches, and the controller may be configured to adjust a waiting time between the notes linked by the slur to "0" seconds.

The acoustic information may further include a tie that links notes of the same pitch, and the controller may be configured to add a duration of a following note to a waiting time between the notes linked by the tie.

The acoustic information may further include a bar indicating that a predetermined section is to be repeated, and the controller may be configured to adjust the voltage such that voltages corresponding to notes in a section indicated by the bar may be repeated.

The driver may include a housing having an accommodation space therein, a vibrator disposed in the accommodation space, an elastic member configured to connect the housing and the vibrator such that the vibrator vibrates with respect to the housing, and a coil configured to form a magnetic field to drive the vibrator, the transmitter may be disposed to cover the accommodation space, a mass of the vibrator may be below 2 grams (g), an elasticity coefficient of the elastic member may be below 2.021 newtons per millimeter (N/mm), and a resonant frequency of the tactile actuator may be below 160 hertz (Hz).

The controller may be configured to determine one of a plurality of predetermined driving modes based on the acoustic information, and the electrical signal may have a frequency corresponding to the determined driving mode.

The plurality of driving modes may include a general vibration mode, a tapping mode, and a rolling mode. The controller may be configured to apply, to the coil, a sine wave electrical signal of a frequency below 160 Hz when the determined driving mode is the general vibration mode, the controller may be configured to apply, to the coil, a square wave or pulse wave electrical signal of a frequency below 60 Hz, which is lower than the frequency of the electrical signal applied in the general vibration mode, when the determined driving mode is the tapping mode, and the controller may be configured to apply, to the coil, a sine wave or pulse wave electrical signal of a frequency lower than the frequency of the electrical signal applied in the general vibration mode and higher than the frequency of the electrical signal applied in the tapping mode when the determined driving mode is the rolling mode.

The acoustic information may include information related to whether a dynamic marking changing the loudness information of the note is present and a type of the dynamic marking, and the controller may be configured to determine the driving mode based on whether the dynamic marking is present and the type of the dynamic marking.

The acoustic information may include information related to a slur that links notes of different pitches, and the controller may be configured to determine the driving mode to be the rolling mode in a section in which notes are linked by the slur.

According to an aspect, there is provided a method of converting an acoustic signal into a tactile signal using a haptic device, the method including inputting stored acoustic information or acoustic information received from an external device, interpreting details of the acoustic information based on a five-line staff, converting the acoustic information into an electrical signal corresponding to a predetermined pattern, generating a motion signal based on the electrical signal, and transmitting a patterned tactile signal to a user using the motion signal.

The interpreting may include determining an arrangement of at least one note or rest, verifying the duration information, the pitch information, and the loudness information of the note, and verifying the duration information of the rest.

The converting may include matching a predetermined corresponding voltage magnitude to each note, and adjusting the voltage magnitude of the electrical signal based on the matched voltage magnitude.

The generating may include generating the motion signal having an amplitude and a frequency corresponding to the pattern of the electrical signal.

The transmitting may include transmitting the tactile signal to a fingertip of the user.

According to an embodiment, it is possible to efficiently pattern, as tactile senses, records such as a score in which an acoustic characteristic is written.

According to an embodiment, it is possible to provide a more rhythmic and higher-dimensional tactile sense, rather than a simple vibration, by distinguishing a loudness and a pitch.

According to an embodiment, it is possible to provide a tactile sense effective for an acoustic effect output from various contents such as images, music, and games.

According to an embodiment, it is possible to increase a user experience of a content user such that the user may receive a great sensitivity.

According to an embodiment, it is possible to provide tactile senses more efficiently than the existing technology, in a frequency range below 160 hertz (Hz), of a frequency range that may be sensed by a human body.

BRIEF DESCRIPTION OF DRAWINGS

The accompanying drawings illustrate preferred embodiments of the present invention, and are provided together with the detailed description for better understanding of the technical idea of the present invention. Therefore, the present invention should not be construed as being limited to the embodiments set forth in the drawings.

FIG. 2 is a table illustrating notes and rests used in a five-line staff.

FIG. 3 is a table illustrating time signatures used in a five-line staff.

FIG. 4 illustrates a tempo, an articulation, and dynamic markings used in a five-line staff.

FIG. 9 illustrates an example of a five-line staff with an indication of a tempo.

FIG. 43 illustrates driving modes in which a tactile actuator operates based on types of dynamic markings according to an embodiment.

DETAILED DESCRIPTION

Figure 1:
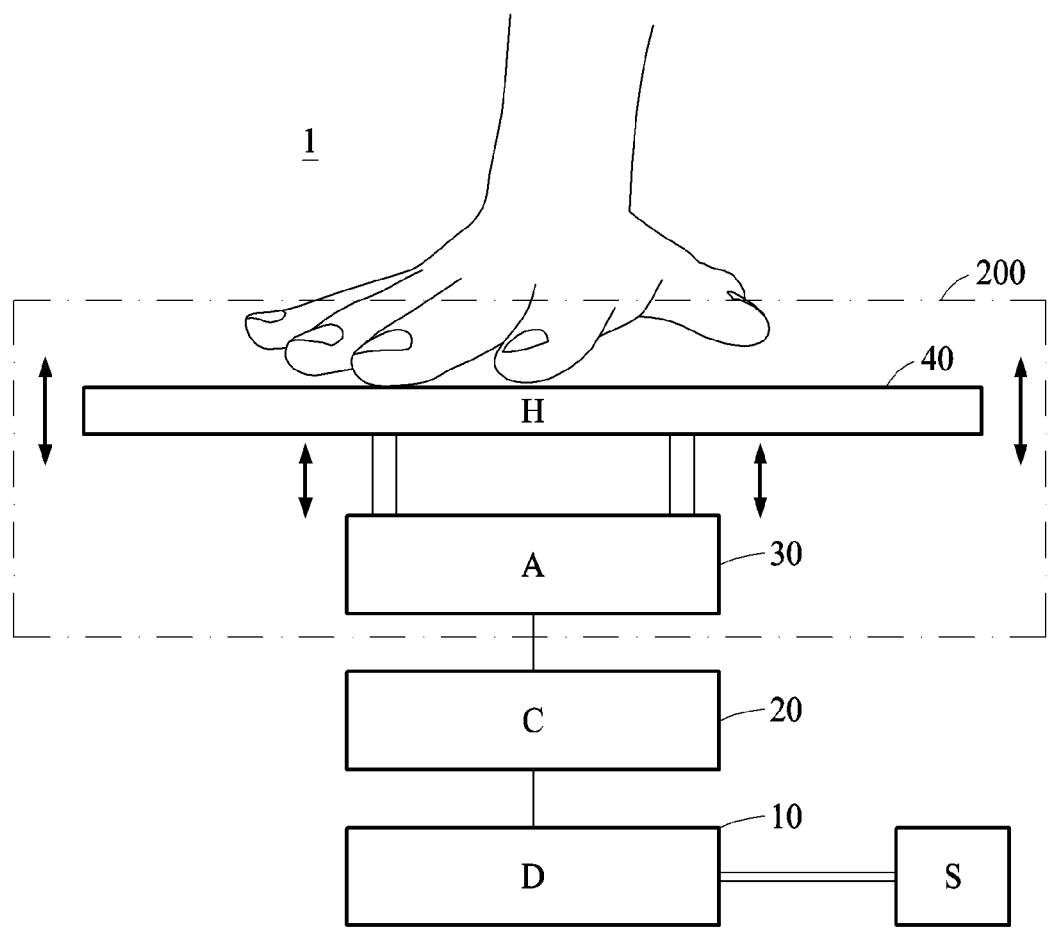
FIG. 1 is a view illustrating a haptic device according to an embodiment.

Hereinafter, embodiments of the present disclosure will be described with reference to the accompanying drawings. Regarding the reference numerals assigned to the components in the drawings, it should be noted that the same components will be designated by the same reference numerals, wherever possible, even though they are shown in different drawings. Also, in the description of the embodiments, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. Each of these terms is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

FIG. 1 is a view illustrating a haptic device 1 according to an embodiment.

Referring to FIG. 1, the haptic device 1 may include a database D 10 that stores acoustic information or receives the acoustic information from an external device S, a controller C 20 that converts the acoustic information into an electrical signal corresponding to a predetermined pattern, and a tactile actuator 200 that receives the electrical signal from the controller 20 and transmits various tactile signals to a user.

The tactile actuator 200 may include a driver A 30 that generates a motion signal based on the electrical signal, and a transmitter H 40 that is physically connected to the driver 30 to transmit a patterned tactile signal to the user using the motion signal. An exemplary configuration of the tactile actuator 200 will be described further with reference to FIGS. 14 through 16.

The external device S may include all devices that may store and transmit the acoustic information, and may be, for example, a typically used mobile device, a universal serial bus (USB) storage medium, or a secure digital (SD) card. For example, the external device S may be connected directly to the database 10, or may transmit the acoustic information to the controller 20 and/or the database 10 through a communicator 50 of FIG. 17 that receives the acoustic information in a wired or wireless manner using the Internet.

The acoustic information may include a text or an image including information related to notes, rests, time signatures, tempos, articulations, dynamic markings, and various signs modifying the same that may be written in a score such as a five-line staff, rather than a source in a form of a sound file such as moving picture experts group (MPEG) audio layer-3 (MP3) which is generally used. The acoustic information may be optimized for the haptic device 1, and thus information may be stored or transmitted and received with a much smaller capacity, when compared to a case of using a sound file.

Music notation (score writing) is the most well known music writing system. Each culture has a unique form of music notation. In general, different scores may be notated in conjunction with each other. Hereinafter, a case in which the haptic device 1 uses a five-line staff which is the most public score among various scores will be described. However, examples may also be applied to scores other than the five-line staff. The haptic device 1 may convert each piece of acoustic information into an electrical signal to be used to provide a tactile signal.

The controller 20 may control a motion of the driver 30 based on the acoustic information. The controller 20 may convert a composition of the score into an electrical signal to be used to drive the driver 30, and the driver 30 may output the electrical signal as a motion signal including a real motion.

The transmitter 40 may be in direct contact with a skin of a hand or another body part of a user, and transmit, to the user, a tactile sense corresponding to a sound being played through a cycle or an intensity of a tactile signal. For example, the transmitter 40 may be a cover or a case that encloses the driver 30. In another example, the transmitter 40 may be a wearable device such as a glove or a watch, or a haptic display capable of a three-axial transitional motion and a three-axial rotational motion.

FIGS. 2 through 6 illustrate various signs used in a five-line staff.

FIG. 2 is a table illustrating notes and rests used in a five-line staff.

A note is a symbol that represents a duration and a pitch of a sound. The duration of the sound may be represented by a type of the note, and the pitch of the sound may be represented by a position of the note on five lines.

A rest is a symbol that represents an interval of silence in a piece of music and a duration thereof. The rest does not have a pitch, and thus is generally written at a predetermined position irrespective of a height on five lines. Durations of rests correspond to durations of corresponding notes having the same names.

With respect to a duration of a sound, "whole" refers to one beat, and half or quarter refers to a ½ beat or a ¼ beat. Thus, a note or a rest on a lower side of the table may have a shorter duration.

FIG. 3 is a table illustrating time signatures used in a five-line staff.

A time signature is a fractional number or a sign (symbol) that follows a clef or a key signature on a right side thereof in a score. A denominator of the fractional number indicates a type of a note being a unit of one beat, and a numerator of the fractional number indicates the number of beats per measure.

For example, time signatures are expressed by fractional numbers such as 4/4, 3/4, 2/4, and 6/8, where denominators thereof each indicate a unit note, and numerators thereof each indicate the number of unit notes per measure. For example, the 4/4 time indicates a time in which a quarter note is one beat, and 4 beats are included in one measure.

FIG. 4 illustrates a tempo, an articulation, and dynamic markings used in a five-line staff.

A tempo indicates a speed of progression of a piece of music or a regulation thereof, and a pace to play the piece of music.

Further, the tempo indicates how to use a metronome, determines a unit note, and indicates the number of unit notes to be played per minute. For example, "♪=120" indicates that a ⅛ beat appears 120 times per minute. In this example, a piece of music is to be played at a tempo where a total of 15 beats appears per minute.

Articulations refer to various methods of musically articulating and linking notes according to a theme of music. The articulations are used together with phrasing. The phrasing divides a melody by a phrase of a predetermined size, whereas an articulation divides the melody by a smaller unit than the phrasing.

The articulations include legato, non-legato, staccato, and portato. Legato indicates that notes are to be played to be linked without separation. Non-legato indicates that notes are to be played for durations shorter than values thereof with a temporal pause therebetween. Staccato indicates that notes are to be played short separately with about half durations thereof. Portato indicates that notes are to be played by sufficiently increasing values thereof through tonguing of each note.

Dynamic markings are markings indicating a vibration in loudness between notes in a portion of a piece of music or in the whole piece of music, and are also referred to as dynamic signs. The dynamic markings are markings used to more minutely and clearly indicate an expression or a characteristic of the piece of music. The dynamic markings are written at the beginning or in the middle of the piece of music to indicate or change loudnesses of notes such as overall dynamics or partial dynamics of the piece of music.

In general, the dynamic markings include pianissimo (pp: very soft), piano (p: soft), mezzo-piano (mp: moderately soft), mezzo-forte (mf: moderately loud), forte (f: loud), fortissimo (ff: very loud), crescendo (cresc: gradually loud), decrescendo (decresc: gradually soft), sforzando (sf: forcefully loud), and fortepiano (fp: loud followed by immediately soft).

Figure 5:
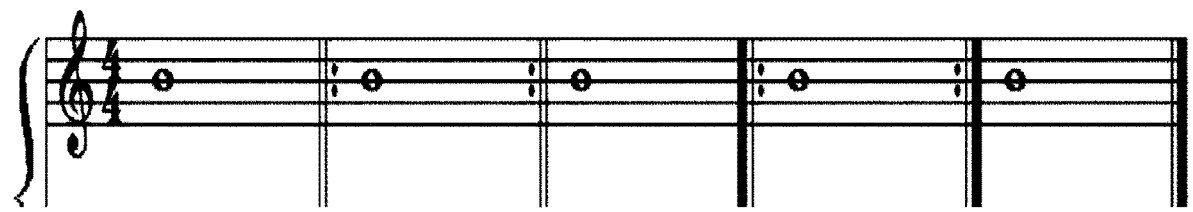
FIG. 5 is a score illustrating bars used in a five-line staff.

FIG. 5 is a score illustrating bars used in a five-line staff.

For example, a repeat sign designates a section to be repeated on a score. The repeat sign includes a sign of two dots beside a double bar in a direction to repeat the section, and a sign using an indication of D.S. or D.C. or a text of bis or ter.

Figure 6:
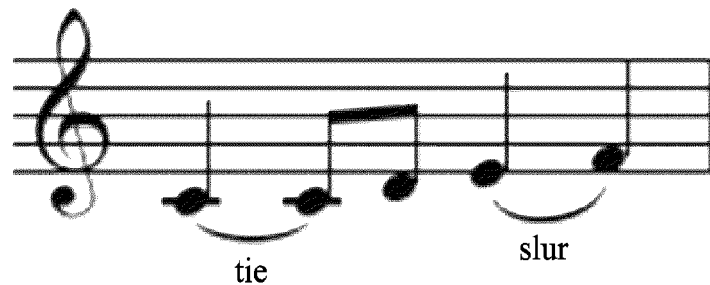
FIG. 6 illustrates pitches, a slur, and a tie used in a five-line staff.

FIG. 6 illustrates pitches, a slur, and a tie used in a five-line staff.

A pitch indicates how high and low a sound is. When a note is positioned at a higher position on a five-line staff, a sound of the note has a higher pitch.

A slur is an arc attached above or below two or more notes of different pitches. The slur indicates that notes that the slur embraces are to be played softly and smoothly (with legato articulation).

A tie is an arc linking two notes of the same pitch at a position above or below the notes. The two notes linked by the tie are played as one continuous sound without separation. The tie links notes in the same measure, and also links notes in different measures across a bar.

Figure 7:
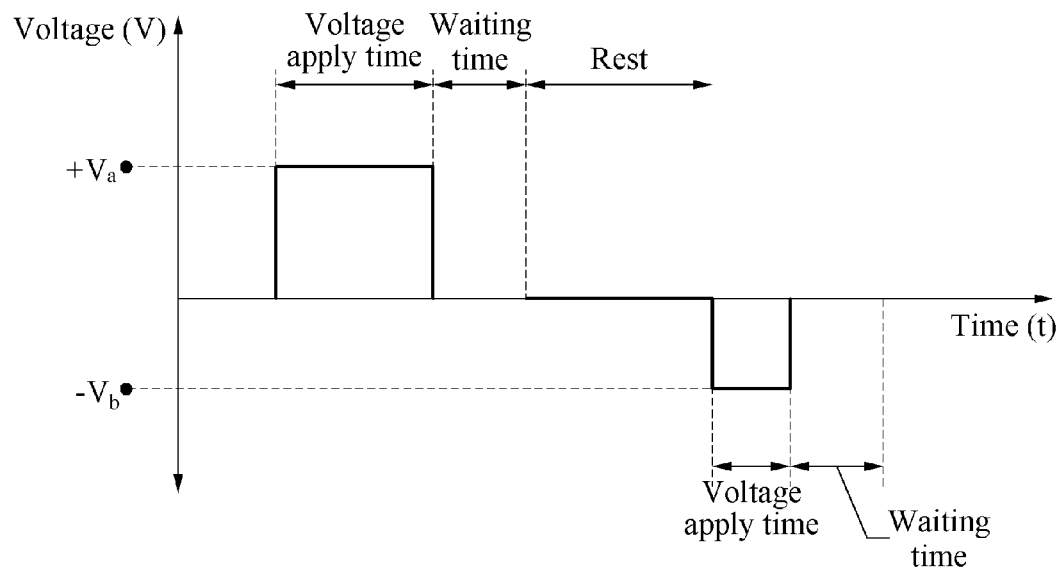
FIG. 7 is a graph illustrating a process of converting acoustic information into an electrical signal.

FIG. 7 is a graph illustrating a process of converting acoustic information into an electrical signal.

The controller 20 of the haptic device 1 may convert acoustic information into an electrical signal. Elements to define the electrical signal are as follows.
 a. Voltage magnitude
 b. Voltage polarity (+, −)
 c. Voltage apply time
 d. Waiting time Acoustic information constituting a score may be converted into an electrical signal to be used to operate a tactile device using the following method.

During the voltage apply time, the electrical signal may have a constant voltage Va, Vb of a predetermined magnitude. During the waiting time, a voltage of the electrical signal may be "0".

A duration of a sound of a single note in a score is equal to a sum of the voltage apply time and the waiting time of the electrical signal. Meanwhile, the voltage apply time and the waiting time may be determined by a preset rate.

The duration of the sound of the single note in the score may be calculated based on a time signature written in the score, a tempo, and the number of beats indicated by the note. The duration may be applied as the sum of the voltage apply time and the waiting time of the electrical signal.

In a case in which a rest is present in the score, the number of beats indicated by the rest may be added to a waiting time of an immediately previous note such that the voltage magnitude of the electrical signal may be continuously maintained to be "0".

The voltage of the electrical signal to be applied by the controller 20 may be determined based on the number of pitches of notes written in a score received by the database 10, within a voltage range in which the driver 30 is properly driven.

For example, the haptic device 1 having a driving voltage range between 1 volt (V) and 8 V may be used. In a case of converting, into a tactile pattern, a score including "CDEFGABC", in which the highest sound is "C" of the second octave and the lowest sound is "C" of the first octave, the driving range of 1V to 8V may be divided by 8 equal parts based on the respective pitches and distributed thereto. For example, the controller 20 may determine a voltage of the electrical signal corresponding to "C" of the second octave, which is the lowest note, to be 1 V, sequentially determine a voltage corresponding to "D" to be 2 V, and finally determine a voltage corresponding to "C" of the third octave to be 8 V. Voltage magnitudes of the electrical signal corresponding to pitches of sounds indicated by the notes are exemplarily shown in the table of FIG. 8.

Meanwhile, in a case in which the number of cases of driving voltages of the driver 30 is less than the number of sounds from the lowest sound to the highest sound of the notes included in the score, the controller 20 may set a region by dividing the total number of the sounds from the lowest sound to the highest sound by the number of cases of the driving voltages, and drive a sound with a different voltage for each region. That is, the controller 20 may drive a plurality of sounds belonging to the same region with the same voltage.

As shown in FIG. 6, in a case in which notes having different pitches are linked by a slur, the voltage magnitude of the electrical signal may change to distinguish a pitch of each sound, a voltage apply time of a preceding note may be set to be equal to a total duration of the corresponding note, and a waiting time may be set to 0 seconds (s).

In a case in which notes having the same pitch are linked by a tie, a waiting time of a preceding note may be newly set by adding a total duration of a following note to the original waiting time of the preceding note, and information related to the following note may be ignored. By the above scheme, the acoustic information may be more simplified, whereby an amount of information written in a score may be reduced further and thus, the acoustic information may be regenerated as information optimized for the haptic device 1.

The controller 20 may interpret meanings of bars such as an end sign and a repeat sign, or abbreviations such as Di capo and Dal Segno that are written in a score, and generate repeated patterns of the electrical signal based on instructions indicated by the corresponding signs.

Further, the controller 20 may not consider a key signature and a modulation of the score, and may determine a magnitude of voltage to be applied based on a pitch of a note in its original position.

Figure 8:
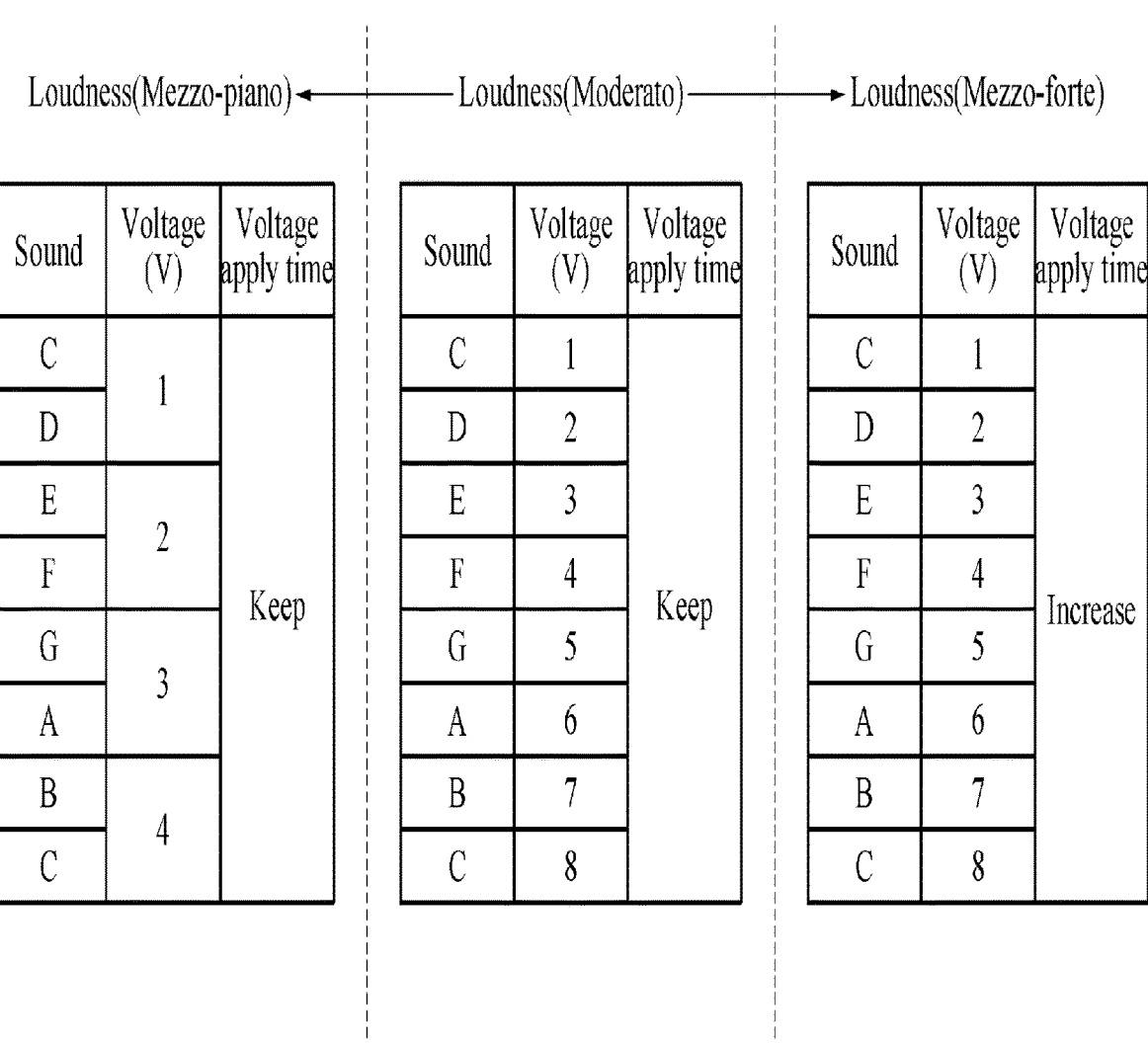
FIG. 8 is a table illustrating an example of changing an intensity of an electrical signal based on a type of a dynamic marking.

FIG. 8 is a table illustrating an example of changing an electrical signal based on a type of a dynamic marking. Types of dynamic markings are shown in FIG. 4.

The controller 20 may interpret a meaning of a dynamic marking, and adjust a magnitude of voltage to be applied or a voltage apply time based on a type of the dynamic marking.

For example, a haptic device having a driving voltage range between 1 V and 8 V may be used. A mezzo-piano score including "CDEFGABC", in which the highest sound is "C" of the second octave and the lowest sound is "C" of the first octave, has a softer mood than a moderato (moderate loudness) score, and thus a voltage to be applied thereto may be set to be lower.

In detail, a pitch-voltage relationship may be set as four stages of (CD)-(EF)-(GA)-(BC), and the voltage to be applied may be distributed to the stages from 1 V to 4 V such that the electrical signal may have a relatively weak overall magnitude of the voltage to be applied when compared to the moderato score.

In another example, a haptic device having a driving voltage range between 1 V and 8 V may be used. A mezzo-forte score including "CDEFGABC", in which the highest sound is "C" of the second octave and the lowest sound is "C" of the first octave, has a louder mood than a moderato (moderate loudness) score, and thus an electrical signal may be adjusted to have a relatively longer voltage apply time. That is, in a case in which a dynamic marking is a forte-type marking, information related to the dynamic marking may be reflected by increasing a voltage apply time and decreasing a waiting time. In other words, by increasing or decreasing the voltage apply time compared to the waiting time for all notes, whether dynamics change may be sensed through a tactile sense.

Example 1

Hereinafter, a method of generating a tactile pattern will be suggested in detail.

FIG. 9 illustrates an example of a five-line staff with an indication of a tempo.

From a score of FIG. 9, the controller 20 may verify a time signature of 4/4 and a tempo indicating that 250 quarter notes are to be played, and calculate a duration of a sound corresponding to a single quarter note through the time signature and the tempo. The calculated duration may be 250 milliseconds (ms) (that is, ¼ s).

Based on the calculated duration, the controller 20 may set durations of an eighth note, a sixteenth note, and a quarter rest used in the score, and set a voltage apply time and a waiting time of an electrical signal corresponding to each note based on a preset rate.

Further, the electrical signal may have a pattern including a total of 8 measures in which 4 measures written in the score are repeated two times based on a repeat sign.

In a case in which a tie exists between notes, for example, in a case in which two eighth notes are linked by a tie, a waiting time of a preceding note may be newly set by adding a total duration, that is, 125 ms, of a following note to the original waiting time of the preceding note, and information related to the following note may be ignored, whereby the electrical signal may be patterned.

In a case in which a rest is placed in the score, for example, in a case in which a quarter rest comes immediately after a quarter note, a waiting time of the quarter note may be newly set by adding 250 ms corresponding to a duration of the rest to the original waiting time of the quarter note previous to the quarter rest, and information related to the quarter rest may be ignored, whereby the electrical signal may be patterned.

In a case in which scores for various musical instruments are provided for a solo or an ensemble in a single piece of music for an orchestra or an opera, the haptic device 1 may divide a melody written in each score by each measure and combine the same in freedom to pattern the electrical signal, thereby patterning a tactile sense.

Figure 10:
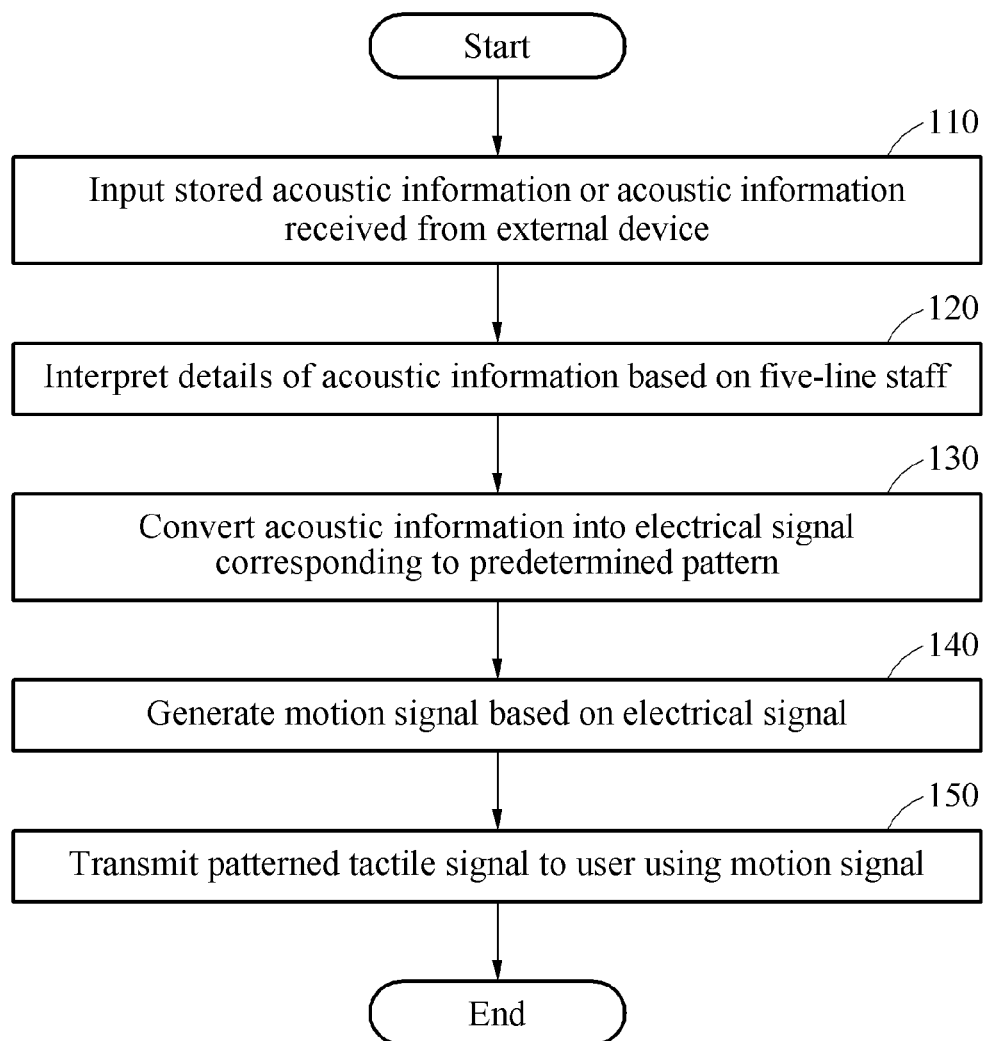
FIG. 10 is a flowchart illustrating a method of converting acoustic information into a tactile signal according to an embodiment.

FIG. 10 is a flowchart illustrating a method 100 of converting an acoustic signal into a tactile signal according to an embodiment.

The method 100 of converting an acoustic signal into a tactile signal may include operation 110 of inputting stored acoustic information or acoustic information received from an external device, operation 120 of interpreting details of the acoustic information based on a five-line staff, operation 130 of converting the acoustic information into an electrical signal corresponding to a predetermined pattern, operation 140 of generating a motion signal based on the electrical signal, and operation 150 of transmitting a patterned tactile signal to a user using the motion signal.

The method 100 may use the haptic device 1 described above. The patterned tactile signal that the user may finally receive may be generated based on the motion signal generated in response to a motion of the driver 30 of the tactile actuator 200, and the motion signal may be controlled based on the patterned electrical signal. Thus, the method 100 may produce a patterned electrical signal by interpreting notes, rests, and various signs constituting a score, and transmit a tactile signal that the user may feel in reality in a patterned form based on the patterned electrical signal.

Figure 11:
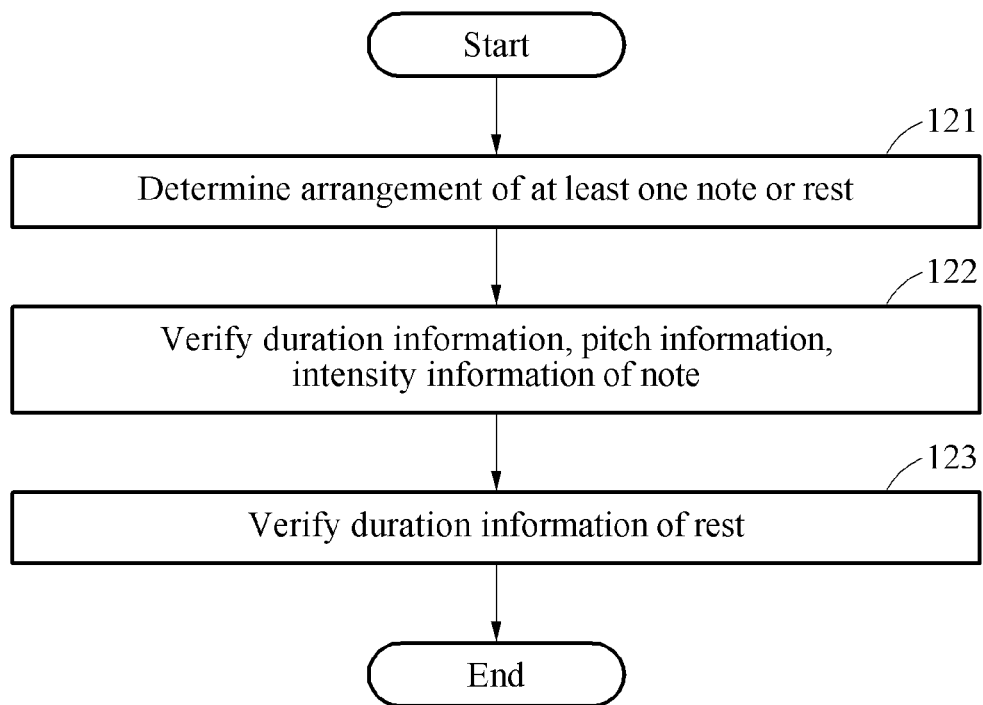
FIG. 11 is a flowchart illustrating an interpreting operation of a method of converting acoustic information into a tactile signal according to an embodiment.

FIG. 11 is a flowchart illustrating operation 120 of the method 100 of converting an acoustic signal into a tactile signal according to an embodiment.

Operation 120 may include operation 121 of determining an arraignment of at least one note or rest, operation 122 of verifying duration information, pitch information, and loudness information of the note, and operation 123 of verifying duration information of the rest.

The duration information of the note may be interpreted based on a time signature and a duration of a note written in a score. The duration information of the note may be equal to a sum of a voltage apply time and a waiting time. The electrical signal may be set to have a voltage magnitude of a predetermined magnitude not being 0 V during the voltage apply time only, and set to have a voltage magnitude of 0 V during the waiting time.

Similar to the note, the duration information of the rest may be interpreted based on the time signature and the duration of the note written in the score. For the duration of the rest, the voltage magnitude may be set to 0 V, similar to the waiting time of the note.

Figure 12:
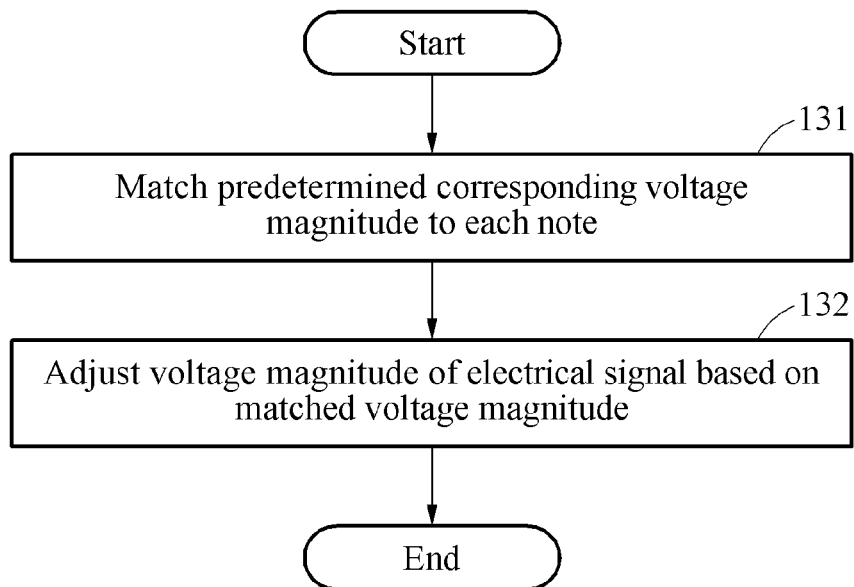
FIG. 12 is a flowchart illustrating a converting operation of a method of converting acoustic information into a tactile signal according to an embodiment.

FIG. 12 is a flowchart illustrating operation 130 of the method 100 of converting an acoustic signal into a tactile signal according to an embodiment.

Operation 130 may include operation 131 of matching a predetermined corresponding voltage magnitude to each note, and operation 132 of adjusting the voltage magnitude of the electrical signal based on the matched voltage magnitude.

After a range of all sounds of notes arranged in a score is verified first, a voltage magnitude to play each sound may be matched. Different voltage magnitudes may be matched to all the sounds, or a portion of adjacent sounds may be tied and the same voltage may be matched thereto. A scheme of tying sounds and matching may vary depending on a dynamic marking written in the score.

A voltage magnitude may be adjusted based on a pitch of a sound corresponding to a note written in the score, and a voltage value may be either positive or negative. For example, based on a predetermined octave, the voltage magnitude may be adjusted to be a minus voltage magnitude with respect to a note of a lower octave, and adjusted to be a plus voltage magnitude with respect to a note of a higher octave.

Figure 13:
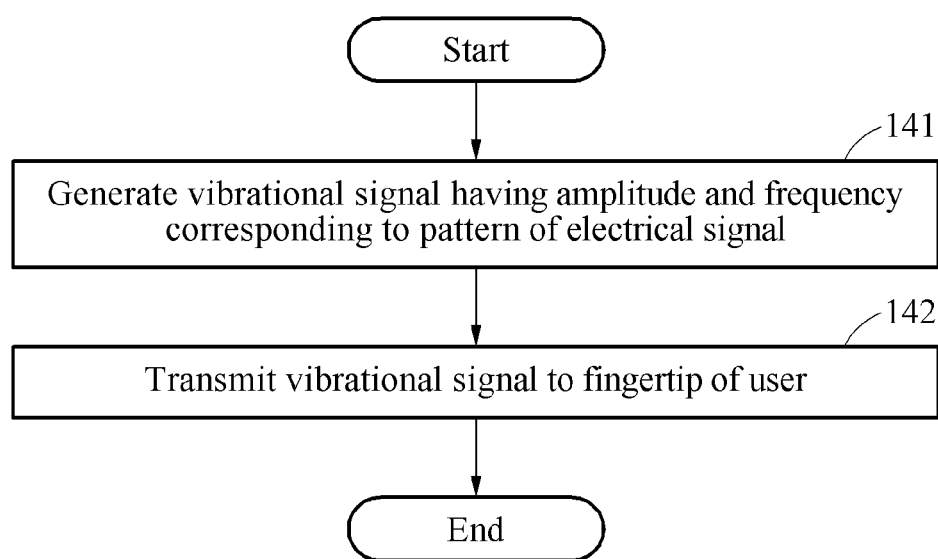
FIG. 13 is a flowchart illustrating a generating operation and a transmitting operation of a method of converting acoustic information into a tactile signal according to an embodiment.

FIG. 13 is a flowchart illustrating operation 140 and operation 150 of the method 100 of converting an acoustic signal into a tactile signal according to an embodiment.

A motion signal used to generate a tactile signal that a user may feel may include, for example, a translational motion, a vibrational motion, and a rotational motion. Hereinafter, a case in which a motion signal is a vibrational signal will be described in detail.

Operation 140 may include operation 141 of generating the motion signal having an amplitude and a frequency corresponding to the pattern of the electrical signal. The vibrational signal may be controlled based on a characteristic of the electrical signal.

For example, in a case in which a sound of a note has a high pitch and thus the voltage of the electrical signal is great, an amplitude of the vibrational signal may increase. In a case in which the sound of the note has a long duration, a frequency of the vibration may increase. During a waiting time of the note or for a duration of a rest, the vibrational signal may be paused.

Operation 150 may include operation 151 of transmitting the vibrational signal to a fingertip of the user. The vibrational signal may be transmitted through a display device or a wearable device to be worn on a hand of the user.

As described above, when the characteristic of the vibrational signal changes, the user may feel transmission of a different sound with the fingertip.

With reference to FIGS. 14 through 43, a configuration of the tactile actuator 200 generating various tactile patterns (general vibration mode, tapping mode, rolling mode), experiment data, and a method and utilization of converting a music signal into various tactile signals using the same will be described.

Figure 14:
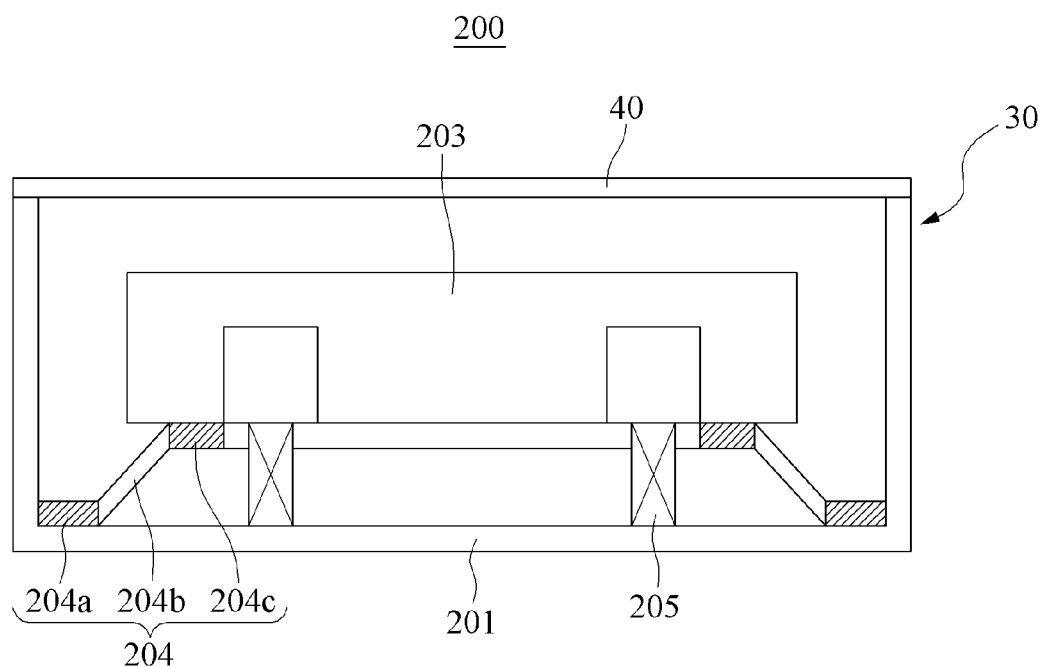
FIG. 14 illustrates an inside of a tactile actuator according to an embodiment.
Figure 15:
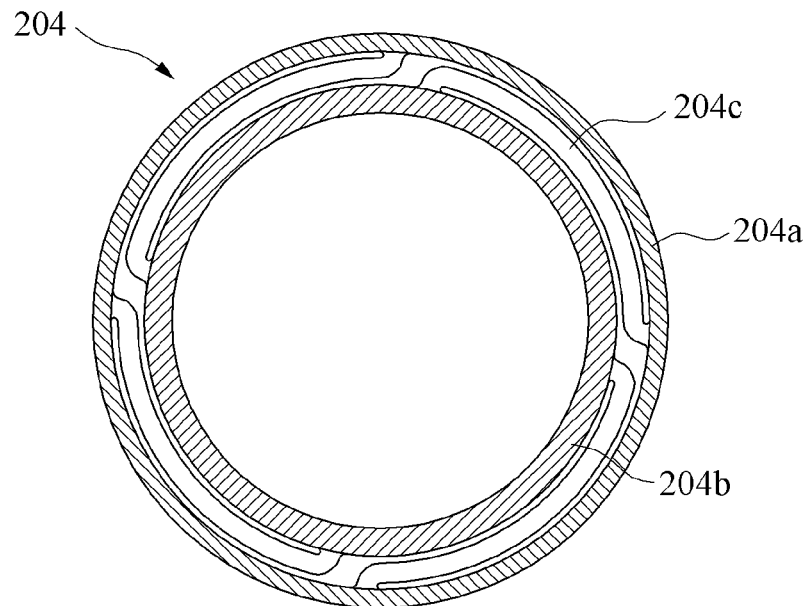
FIG. 15 illustrates an elastic member according to an embodiment.
Figure 16:
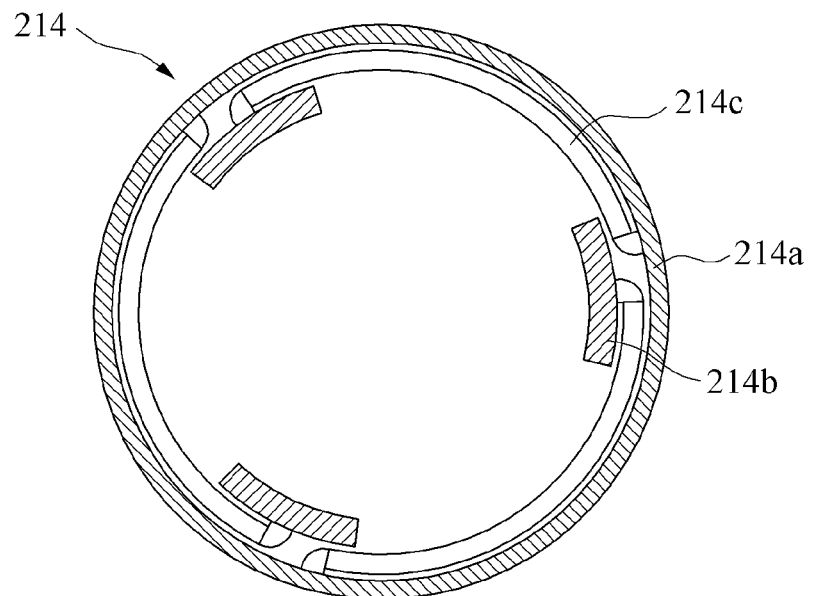
FIG. 16 illustrates an elastic member according to another embodiment.
Figure 17:
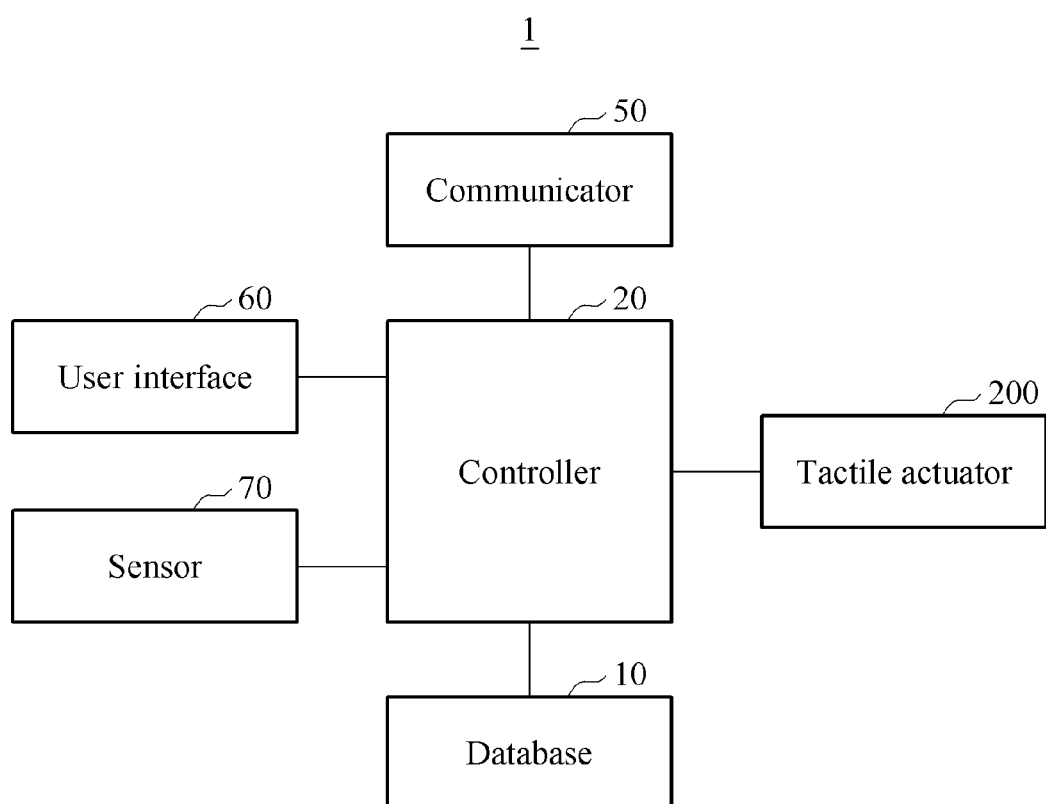
FIG. 17 is a block diagram of a tactile actuator according to an embodiment.

FIG. 14 illustrates an inside of the tactile actuator 200 according to an embodiment, FIG. 15 illustrates an elastic member 204 according to an embodiment, FIG. 16 illustrates an elastic member 214 according to another embodiment, and FIG. 17 is a block diagram of the tactile actuator 200 according to an embodiment.

Referring to FIGS. 14 through 17, the tactile actuator 200 may include the driver 30 and the transmitter 40, and the driver 30 may include a housing 201, a vibrator 203, the elastic member 204, and a coil 205.

The housing 201 may include, for example, an accommodation space with an opened top. Although the housing 201 is illustrated as a box shape, the shape of the housing 201 is not limited thereto.

The transmitter 40 may cover at least a portion of the accommodation space. An edge portion of the transmitter 40 may be fixed to a side wall of the housing 201. Through a body of a user in direct or indirect contact with the transmitter 40, vibration generated by the vibrator 203 may be transmitted. For example, the transmitter 40 may include a more flexible material than the housing 201, so as to properly transmit a tactile sense such as vibration, tapping, or rolling of the vibrator 203 to the user.

The vibrator 203 may be disposed in the accommodation space of the housing 201, and may be driven by a magnetic field generated by an electrical signal applied to the coil 205. The vibrator 203 may include a material to be driven by the magnetic field. The vibrator 203 may be construed as a "magnetic circuit and mass body".

For example, the vibrator 203 may be made of soft magnetic materials having intrinsic coercivities below at least 1000 amperes/meter (A/m), among ferromagnetic materials, and include a material having a structure such as steel, powder, alloy, alloy powder, composites, or a nanostructure including at least one of elements such as Fe, Ni, Si, Mn, and Zn. The overall configuration may not need to be made of a single material.

In another example, the vibrator 203 may include a material purely including Cu or W having a specific gravity over 8, among paramagnetic materials, or a material having a structure such as alloy, alloy powder, composites, or a nanostructure including at least one of the soft magnetic elements such as Fe, Ni, Si, Mn, and Zn mentioned above. Similarly, the material and the structure of the magnetic circuit and mass body may not need to be uniform.

A portion of the vibrator 203 may include a material having a structure such as steel, powder, alloy, alloy powder, composites, or a nanostructure including at least one of elements such as Fe, Co, Ni, Nd, Ni, B, and Zn as the ferromagnetic materials, and include a material magnetized such that the N pole and the S pole thereof may be distinguished in a vertical direction of FIG. 14.

The elastic member 204 may connect the housing 201 and the vibrator 203 such that the vibrator 203 may vibrate with respect to the housing 201. For example, the elastic member 204 may include a low paramagnetic or diamagnetic material, for example, stainless steel, plastic, or rubber, which has an elasticity that may deform by an external force and be restored to its original shape immediately when the external force disappears.

The elastic member 204 may include a fixture 204a fixed to the housing 201, a support 204b configured to support the vibrator 203, and a connector 204c configured to connect the fixture 204a and the support 204b. For example, a diameter of the fixture 204a may be greater than a diameter of the support 204b.

Meanwhile, although FIGS. 14 and 15 exemplarily illustrate a case in which the fixture 204a and the support 204b are ring-shaped, a support 214b of an elastic member 214 may include a plurality of segments, as shown in FIG. 16, which may also apply to a fixture 214a.

The coil 205 may form a magnetic field to drive the vibrator 203 using the electrical signal applied thereto. For example, the coil 205 may include a planar coil, a solenoid coil, or an electromagnetic coil having a core including soft magnetic materials.

FIG. 17 is a block diagram of a tactile actuator according to an embodiment.

Referring to FIG. 17, the haptic device 1 may include the tactile actuator 200, the database 10, the controller 20, the communicator 50, a user interface 60, and a sensor 70.

The user interface 60 may receive an instruction directly from the user. For example, the user interface 60 may be a keyboard, a mouse, or a touch panel. However, the type of the user interface 60 is not limited thereto.

The sensor 70 may sense an external environment of the tactile actuator 200. For example, the sensor 70 may sense temperature, humidity, pressure, or light intensity, convert the sensed information into an electric signal, and transmit the electric signal to the controller 20. However, the type of the sensor 70 is not limited thereto.

The database 10 may store acoustic information. For example, in addition to a source in a form of a sound file such as MP3 which is generally used, a text or an image including information related to notes, rests, and various signs modifying the same that may be written in a score such as a five-line staff may be stored in the database 10. Data received from the user interface 60, the sensor 70, and/or the communicator 50 may also be stored in the database 10. A plurality of preset driving modes may also be stored in the database 10.

The communicator 50 may receive acoustic information through wired or wireless communication with another communication device. For example, the communicator 50 may receive external data such as a sound, a score, an image, and a text through the Internet, and transmit the external data to the controller 20 and/or the database 10.

The user interface 60, the sensor 70, the database 10, and the communicator 50 may be collectively referred to as an "information providing device". The information providing device may provide driving information collected by the controller 20. An embodiment relates to the tactile actuator 200 that may operate in a plurality of driving modes based on information provided from the information providing device to the controller 20. However, the type of the collected information or the type of the device providing the information is not limited thereto. For example, the driving information may include the acoustic information described above. That is, the driving information may include a text or an image including information related to notes, rests, time signatures, tempos, articulations, dynamic markings, and various signs modifying the same that may be written in a score such as a five-line staff.

The controller 20 may determine one of the plurality of preset driving modes based on the collected driving information. Here, the driving information collected by the controller 20 may be information received from the information providing device. The controller 20 may determine a characteristic of an electrical signal to be applied to the coil 205 based on the determined driving mode. Here, the characteristic of the electrical signal may include an intensity, an apply time, a frequency, and a waveform.

An embodiment may enable vibration in a low frequency region by changing a physical property of the elastic member 204. Table 1 showing an elasticity coefficient of an elastic member induced from a mass of a vibrator and a resonant frequency of an existing tactile actuator based on the following Equation 1, and Table 2 showing an elasticity coefficient of the elastic member 204 of the tactile actuator 200 are suggested as follows.

$$f = \frac{1}{2\pi}\sqrt{\frac{k}{m}} \quad \text{[Equation 1]}$$

TABLE 1

Elasticity Coefficients of Elastic Members Used for Existing Tactile Actuator

| Spring No. | Measured Freq. (Hz) | Mass (g) | Induced Spring Constant (N/mm) |
|---|---|---|---|
| 1 | 154.7 | 1.578 | 1.491 |
| 2 | 154.1 | 1.578 | 1.479 |
| 3 | 152.7 | 1.578 | 1.453 |
| 4 | 149.8 | 1.578 | 1.398 |
| 5 | 153.0 | 2.23 | 2.061 |
| 6 | 160.0 | 2.23 | 2.254 |

TABLE 2

Elasticity Coefficients of Elastic Members Used for Tactile Actuator According to Embodiment

| Spring No. | Measured Freq. (Hz) | Mass (g) | Induced Spring Constant (N/mm) |
|---|---|---|---|
| 7 | 98.7 | 0.65 | 0.250 |
| 8 | 81.4 | 0.79 | 0.207 |
| 9 | 75.7 | 0.93 | 0.210 |
| 10 | 85.3 | 1.09 | 0.313 |
| 11 | 78.2 | 1.04 | 0.251 |

Referring to Table 1 and Table 2, the elasticity coefficient of the elastic member 204 may be set to be over 0.2 newtons per millimeter (N/mm) and below 0.35 N/mm such that the tactile actuator 200 including, for example, the vibrator 203 with a mess ranging from 0.6 to 1.1 grams (g) may have a low resonant frequency below 100 Hz.

Figure 18:
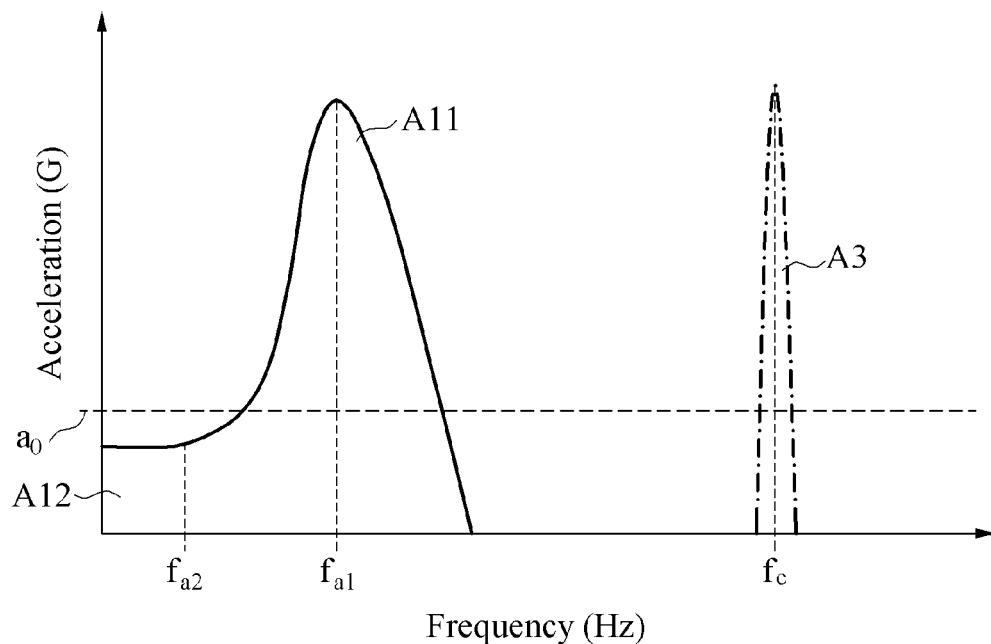
FIG. 18 is a graph conceptually illustrating a driving region with respect to a frequency, in a tactile actuator according to an embodiment.
Figure 19:
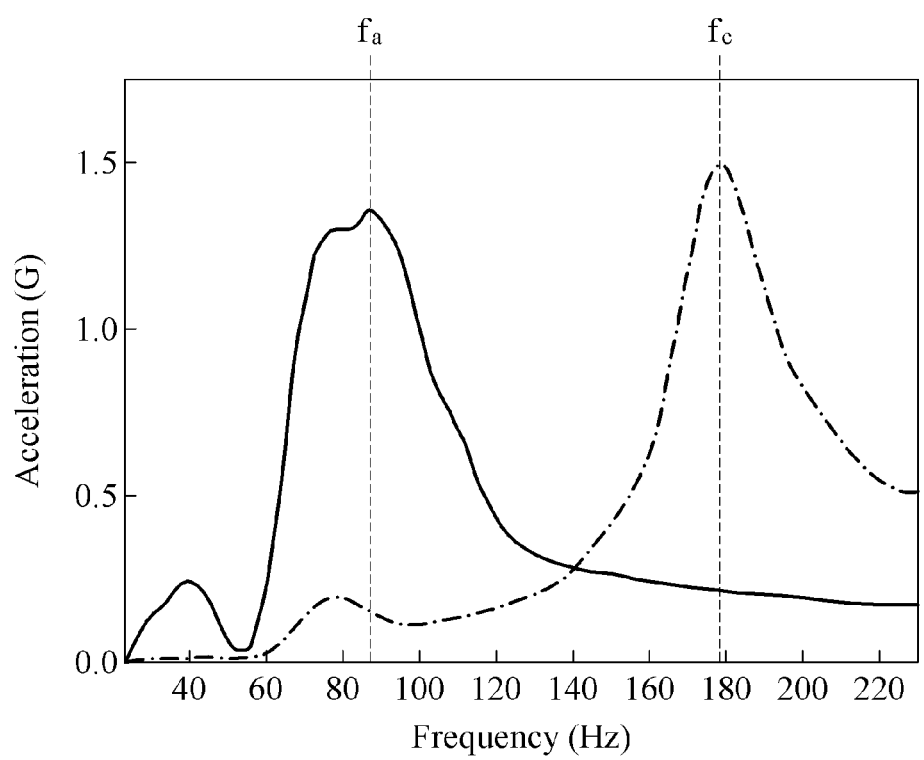
FIG. 19 is a graph illustrating a relationship between an actually measured frequency and an acceleration, in a tactile actuator according to an embodiment.

FIG. 18 is a graph conceptually illustrating a driving region with respect to a frequency, in a tactile actuator according to an embodiment, and FIG. 19 is a graph illustrating a relationship between an actually measured frequency and an acceleration, in the tactile actuator according to an embodiment.

A solid line is a graph illustrating an operation of the tactile actuator 200, a dot-and-dash line is a graph illustrating an operation of an existing general linear resonant actuator (LRA), and a broken line is a graph illustrating an operation of a multifunction vibration actuator with an improved driving frequency band from the existing general LRA.

Referring to FIGS. 18 and 19, the tactile actuator 200 may have at least two driving modes based on the electrical signal applied to the coil 205.

Referring to the graph (dot-and-dash line) of the existing general LRA, the existing general LRA has a maximum vibration force at a single resonant frequency f_c above 170 Hz, and has a drivable frequency band in a relatively narrow frequency band A3.

Since existing tactile methods are limited to vibration, outputs in a frequency band in which periodic vibration is not formed were defined as noise and ignored, and thus the tactile methods failed to provide various tactile senses.

Meanwhile, referring to the graph (solid line) of the tactile actuator, the tactile actuator has at least one resonant frequency f_a1 below 160 Hz, and may suggest a tactile sense in a form of vibration that is output from an existing haptic device in a frequency band A11 including the corresponding resonant frequency f_a1.

Further, in a region below a threshold frequency f_a2 which is approximately ⅓ the corresponding resonant frequency f_a1, the tactile actuator includes at least one different frequency band A12 in which a force may be provided, rather than vibration, and the corresponding force may be tactile senses such as tapping and rolling. Here, the threshold frequency may be a minimum frequency at which periodic vibration is formed without showing collapse of a waveform generated based on an input electrical signal.

Figure 20:
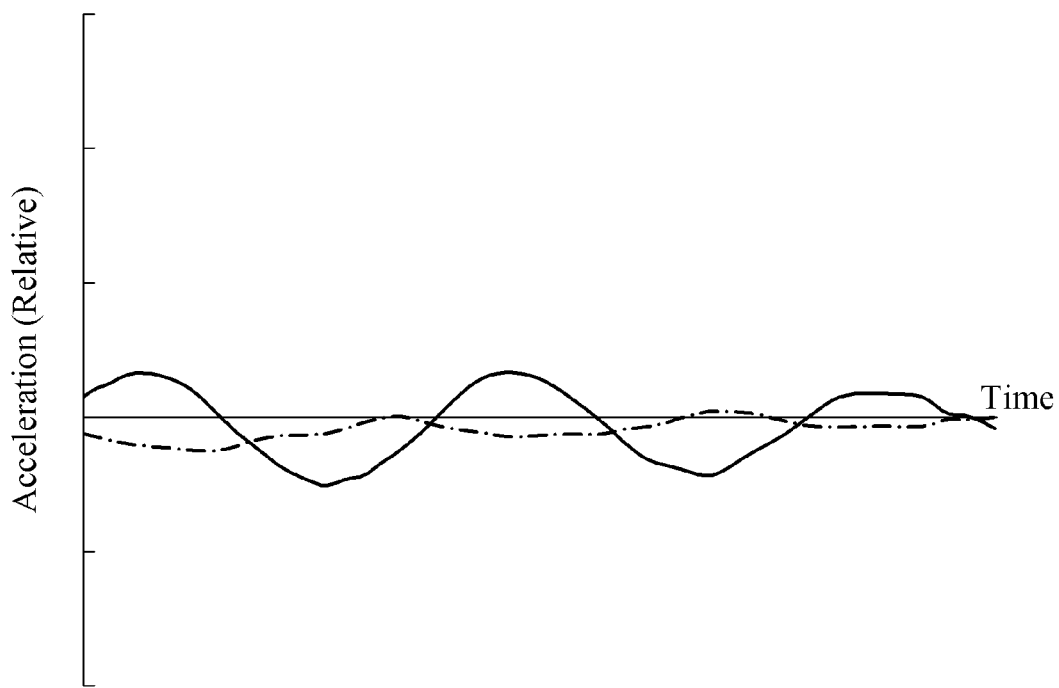
FIG. 20 is a graph illustrating a relationship between a measured frequency and an acceleration when a square wave electrical signal having a low frequency is applied, in a tactile actuator according to an embodiment.
Figure 21:
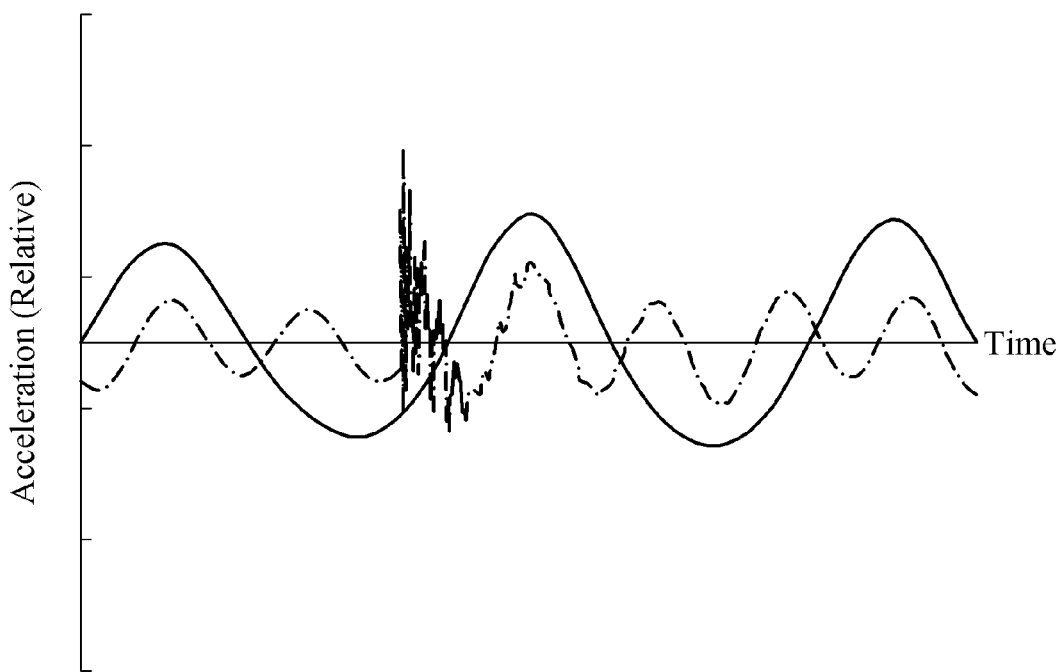
FIG. 21 is a graph illustrating a relationship between a measured frequency and an acceleration when a sine wave electrical signal having a low frequency is applied, in a tactile actuator according to an embodiment.

FIG. 20 is a graph illustrating a relationship between a measured frequency and an acceleration when a square wave electrical signal having a low frequency is applied, in a tactile actuator according to an embodiment, and FIG. 21 is a graph illustrating a relationship between a measured frequency and an acceleration when a sine wave electrical signal having a low frequency is applied, in the tactile actuator according to an embodiment.

A solid line is a graph illustrating an operation of the tactile actuator 200, and a dot-and-dash line is a graph illustrating an operation of the existing general LRA.

Referring to FIGS. 20 and 21, when an electrical signal of a low frequency flows, the existing general LRA showed noise unsuitable for actual use, whereas the tactile actuator 200 showed a vibration pattern suitable for a waveform of the provided external electrical signal.

Figure 22:
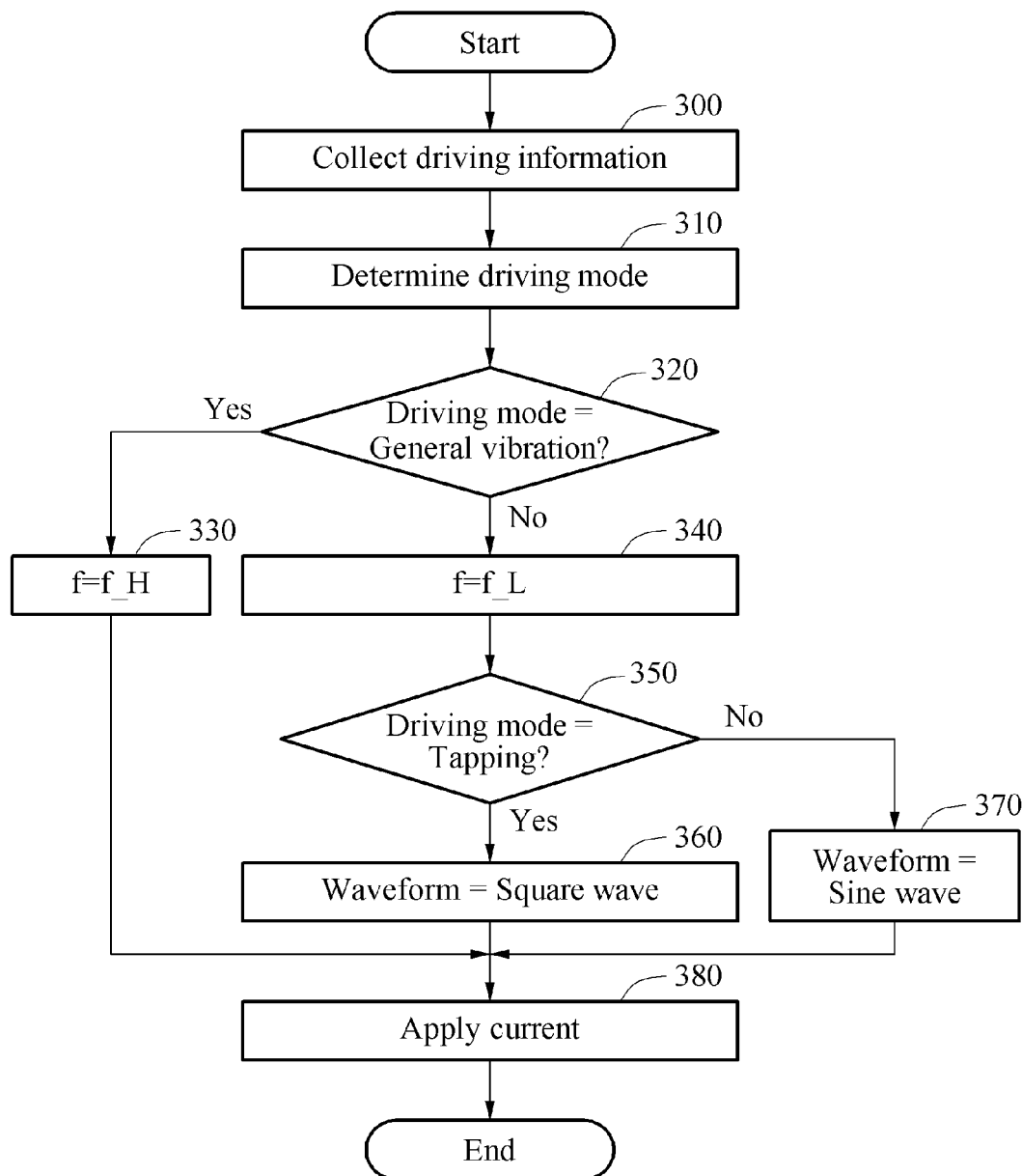
FIG. 22 illustrates a control method for a tactile actuator according to an embodiment.
Figure 23:
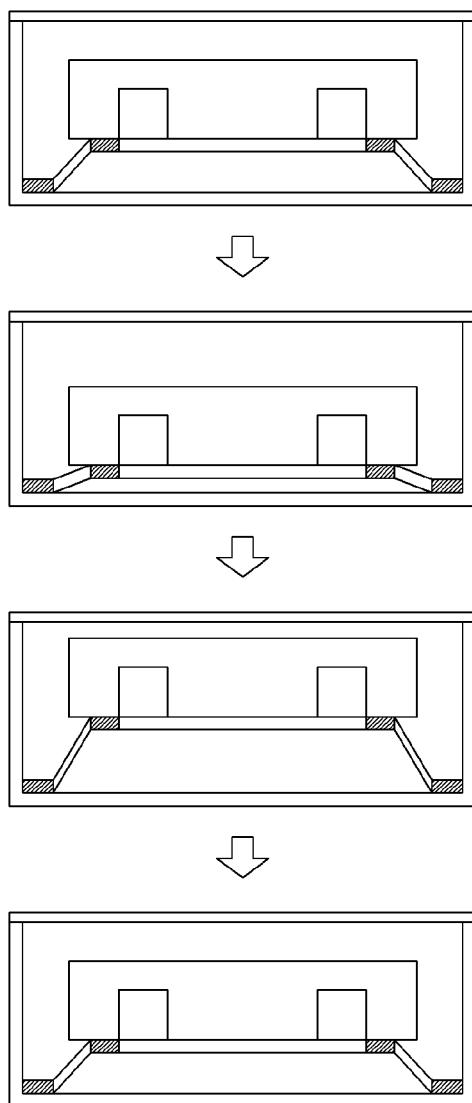
FIG. 23 illustrates an example of an operation of a tactile actuator according to an embodiment.
Figure 24:
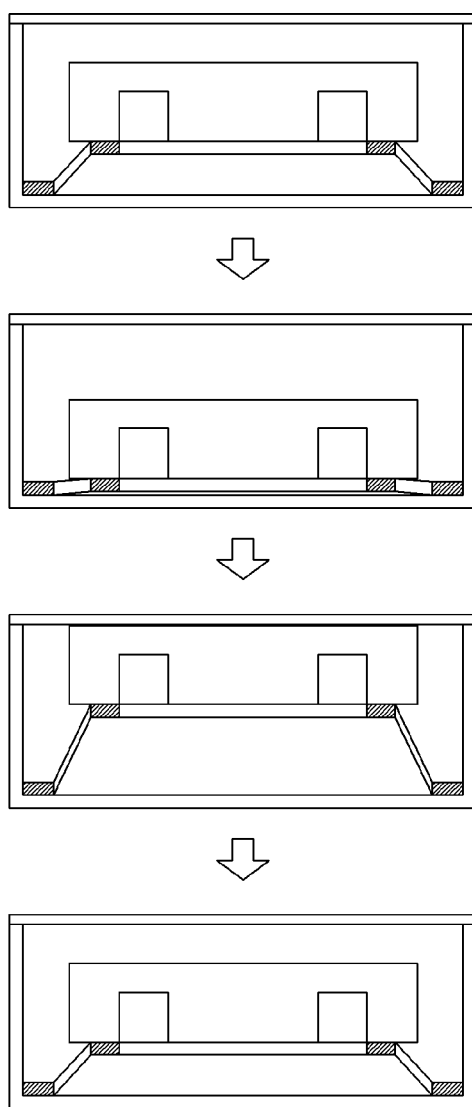
FIG. 24 illustrates another example of an operation of a tactile actuator according to an embodiment.

FIG. 22 illustrates a control method for a tactile actuator according to an embodiment, FIG. 23 illustrates an example of an operation of the tactile actuator according to an embodiment, and FIG. 24 illustrates another example of an operation of the tactile actuator according to an embodiment.

Referring to FIG. 22 through 24, driving information input through the information providing device 10, 50, 60, 70 of FIG. 17 may be collected by the controller 20, in operation 300. Based on the driving information collected in operation 300, the controller 20 may determine an electrical signal to be applied to the coil 205. The controller 20 may determine an apply time, an intensity, and/or a frequency of the electrical signal. The controller 20 may determine one of a plurality of preset driving modes, and determine the frequency of the electrical signal based on the determined driving mode, in operation 310. Here, the plurality of preset driving modes may include, for example, a general vibration mode, a tapping mode, and/or a rolling mode. Hereinafter, a case in which a first set mode is the general vibration mode, a second set mode is the tapping mode, and a third set mode is the rolling mode will be described.

For example, the driving information collected in operation 300 may include acoustic information related to duration information of a sound, pitch information of the sound, whether a dynamic marking is present, and a type of the dynamic marking. In operation 310, the controller 20 may determine the apply time of the electrical signal based on the duration information of the sound, determine the intensity of the electrical signal based on the pitch information of the sound, determine the driving mode to be a general vibration mode, a tapping mode, or a rolling mode based on whether a dynamic marking is present, whether the dynamic marking is a forte-type marking, or whether the dynamic marking is a piano-type marking, and determine the frequency of the electrical signal to correspond to the determined driving mode.

Whether the driving mode determined in operation 310 is the general vibration mode may be determined, in operation 320. When the determined driving mode is the first set mode (general vibration mode), the controller 20 may determine the frequency of the electrical signal to be a first set frequency f_H higher than a threshold frequency, which is a minimum frequency to form a vibration force with a shape of a periodic sine wave, in operation 330. The controller 20 may apply the electrical signal corresponding to the determined apply time, the determined intensity, and the determined frequency to the coil 205, in operation 380. The first set frequency f_H may be set to be a value belonging to the frequency band A11 of FIG. 18 around the resonant frequency of the tactile actuator 200. For example, the first set frequency f_H may be a value below 160 Hz.

When the electrical signal having the first set frequency f_H is applied in operation 380, the vibrator 203 may vibrate up and down in the accommodation space of the housing 201, as shown in FIG. 23. The vibration may be transmitted to the user sequentially through the elastic member 204, the housing 201, and the transmitter 40. In the first set mode, a frequency high enough to form a periodic vibration force may be input. Thus, similar vibration may be generated without being affected greatly by a type of an input waveform. That is, the type of the input waveform in the first set mode is not limited.

Meanwhile, when the driving mode determined in operation 310 is a set mode other than the first set mode, the controller 20 may determine the frequency of the electrical signal to be the second set frequency f_L which is lower than the first set frequency f_H, in operation 340. The second set frequency f_L may be determined to be a value lower than the threshold frequency. For example, the second frequency f_L may be a value below ⅓ the resonant frequency of the tactile actuator 200.

After operation 340 is performed, the controller 20 may determine whether the driving mode is the second set mode (tapping mode), in operation 350. When the driving mode is determined to be the second set mode (tapping mode) in operation 350, the controller 20 may determine a waveform of the electrical signal to be a square wave or a pulse wave. Conversely, when the driving mode is determined to be the third set mode (rolling mode) in operation 350, the controller 20 may determine the waveform of the electrical signal to be a sine wave. The controller 20 may apply the electrical signal of the set frequency and the set waveform to the coil 205, in operation 380.

When the electrical signal having the second set frequency f_L is applied in operation 380, the vibrator 203 may not form a periodic vibration force, and thus transmit a different tactile sense to the user based on the input waveform, as described below.

First, in a case in which the waveform of the input electrical signal is a sine wave, the vibrator 203 not forming a periodic vibration force may move up and down aperiodically. In addition, due to a characteristic of the sine wave, an intensity of the electrical signal input into the coil 205 may change gently. Thus, the user may feel a tactile sense of rolling through the above motion. Herein, "rolling" may be construed as collectively referring to a series of aperiodic tactile senses. When applying the above conditions to a prototype in practice, the user felt a tactile sense of rolling.

Next, in a case in which the waveform of the input electrical signal is a square wave or a pulse wave, the vibrator 203 not forming a periodic vibration force may similarly move up and down aperiodically. However, due to a characteristic of the square wave or the pulse wave, the intensity of the electrical signal input into the coil 205 may change radically. Thus, at each periodic instant at which the intensity of the electrical signal changes, an acceleration in a direction in which the vibrator 203 moves up and down may change much greatly, when compared to other sections. A tactile sense that the user feels at an instant at which the intensity of the electrical signal changes may increase a threshold value of a sense of touch of the user, which may cause a sensory adaptation such that the user may not feel a tactile sense in remaining sections. Thus, the user may feel a tactile sense of "tapping". Herein, "tapping" may be construed as collectively referring to a tactile sense of periodically repeating an impulse high enough to be more distinguishing than the remaining sections. When applying the above conditions to a prototype in practice, the user felt a tactile sense of tapping.

That is, when an electrical signal having a frequency below ⅓ the resonant frequency of the tactile actuator 200 is input, the user may feel at least two different tactile senses based on a waveform of the electrical signal.

Meanwhile, for example, in a case in which a distance between the vibrator 203 and the transmitter 40 is sufficiently close, or a sufficient voltage is input, the vibrator 203 may be in direct contact with the transmitter 40, as shown in FIG. 24, thereby transmitting a force directly to the user through the transmitter 40.

Hereinafter, graphs showing experiment results using the tactile actuator 200 will be described in detail.

Figure 25:
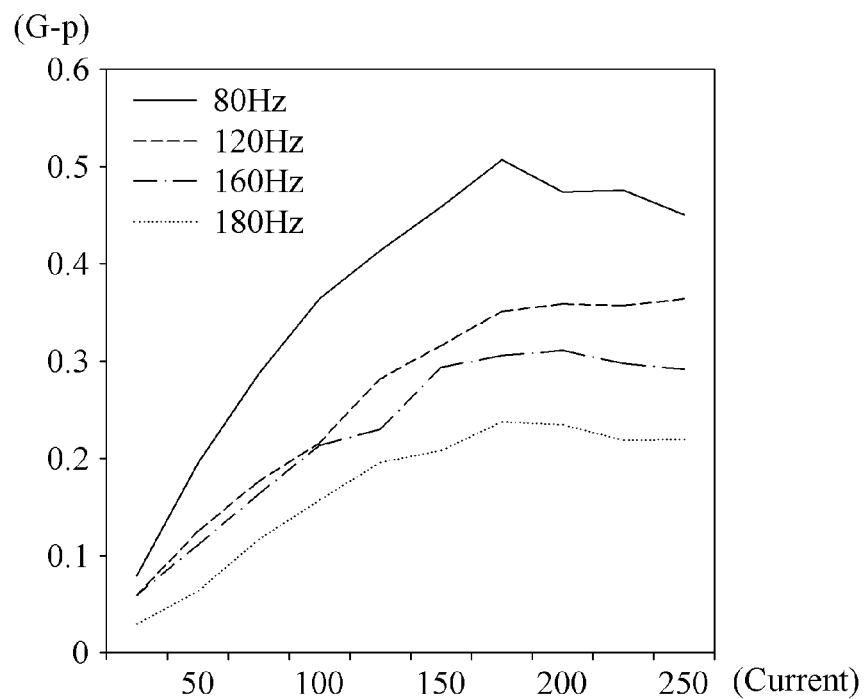
FIG. 25 is a graph illustrating a change in an acceleration with respect to a change in an intensity of a square wave input electrical signal of 5 hertz (Hz), in tactile actuators having different resonant frequencies.
Figure 26:
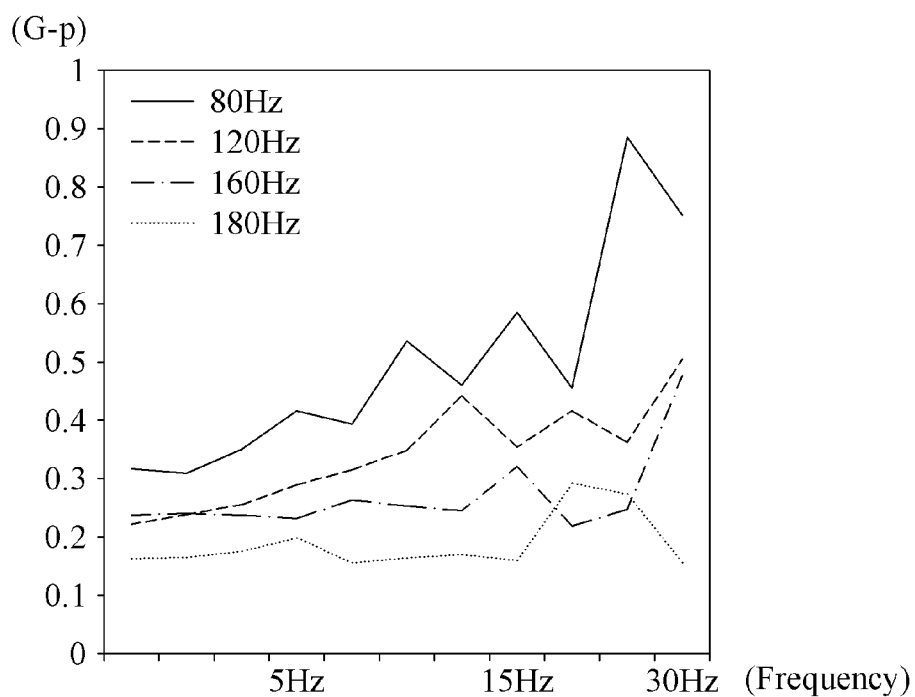
FIG. 26 is a graph illustrating a change in an acceleration with respect to a change in a frequency of a square wave input electrical signal of 90 milliamperes (mA), in tactile actuators having different resonant frequencies.
Figure 27:
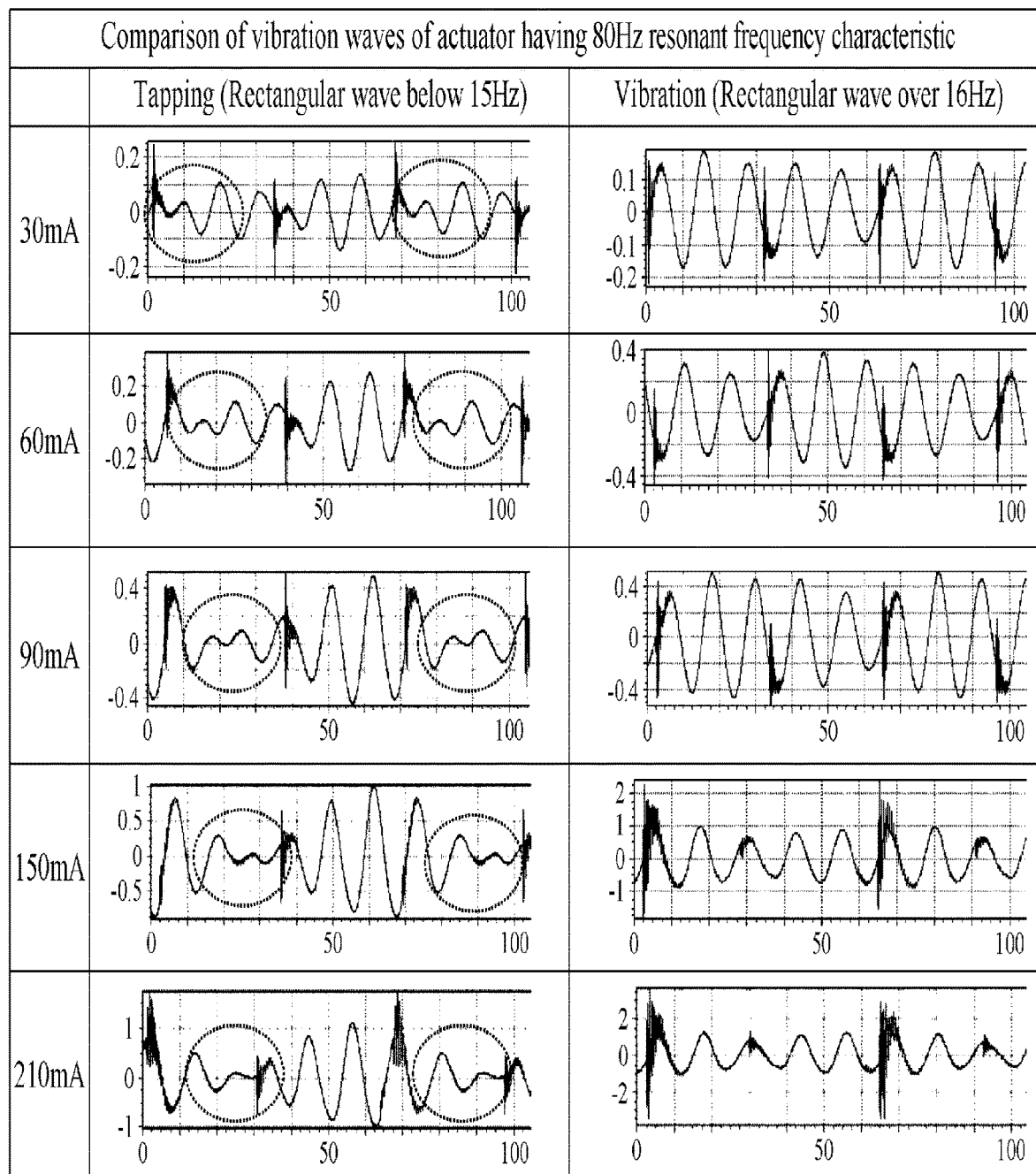
FIG. 27 illustrates waveforms of a vibrator exhibited in response to a change in a square wave electrical signal input into a tactile actuator having a resonant frequency characteristic of 80 Hz.
Figure 28:
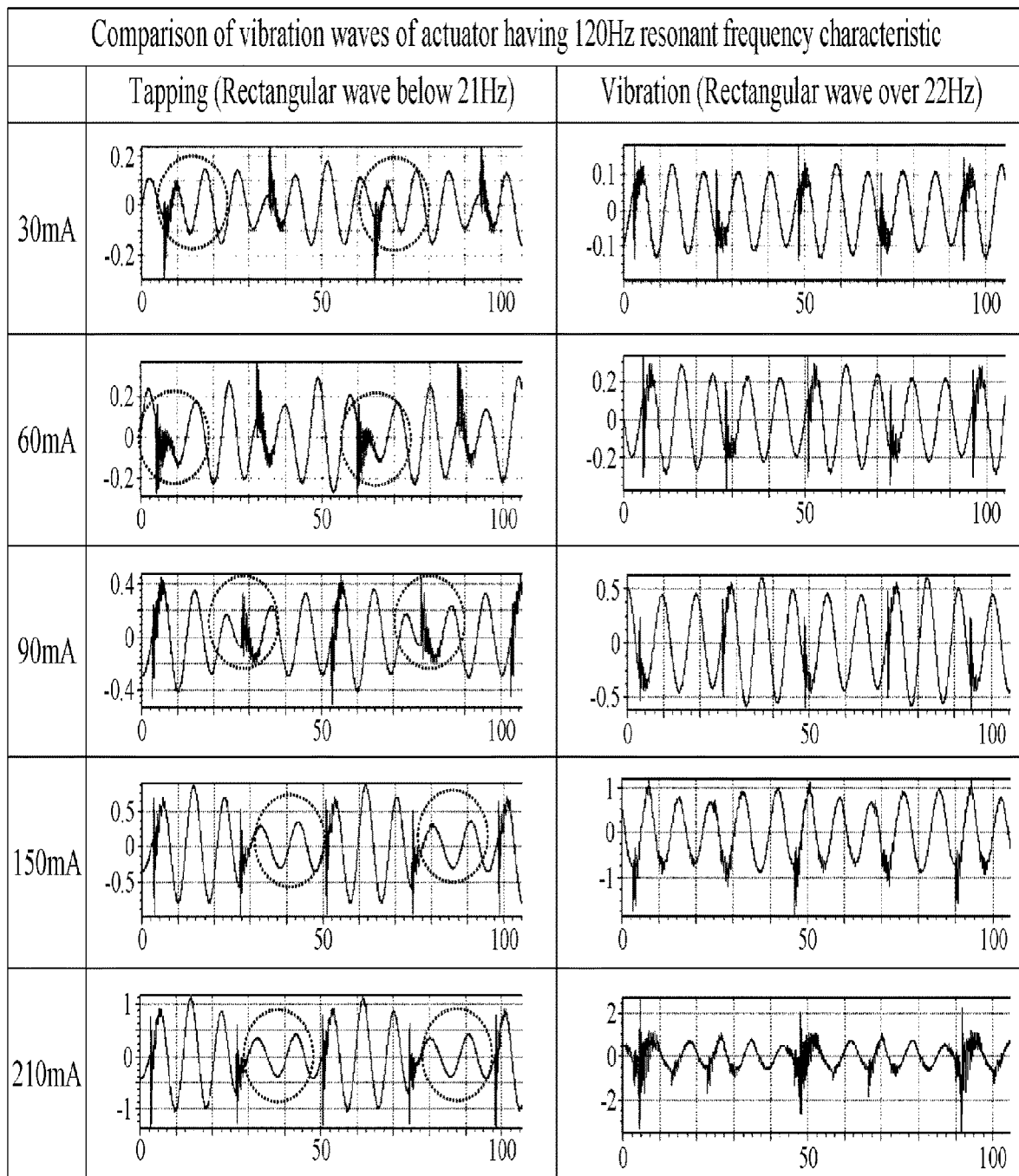
FIG. 28 illustrates waveforms of a vibrator exhibited in response to a change in a square wave electrical signal input into a tactile actuator having a resonant frequency characteristic of 120 Hz.
Figure 29:
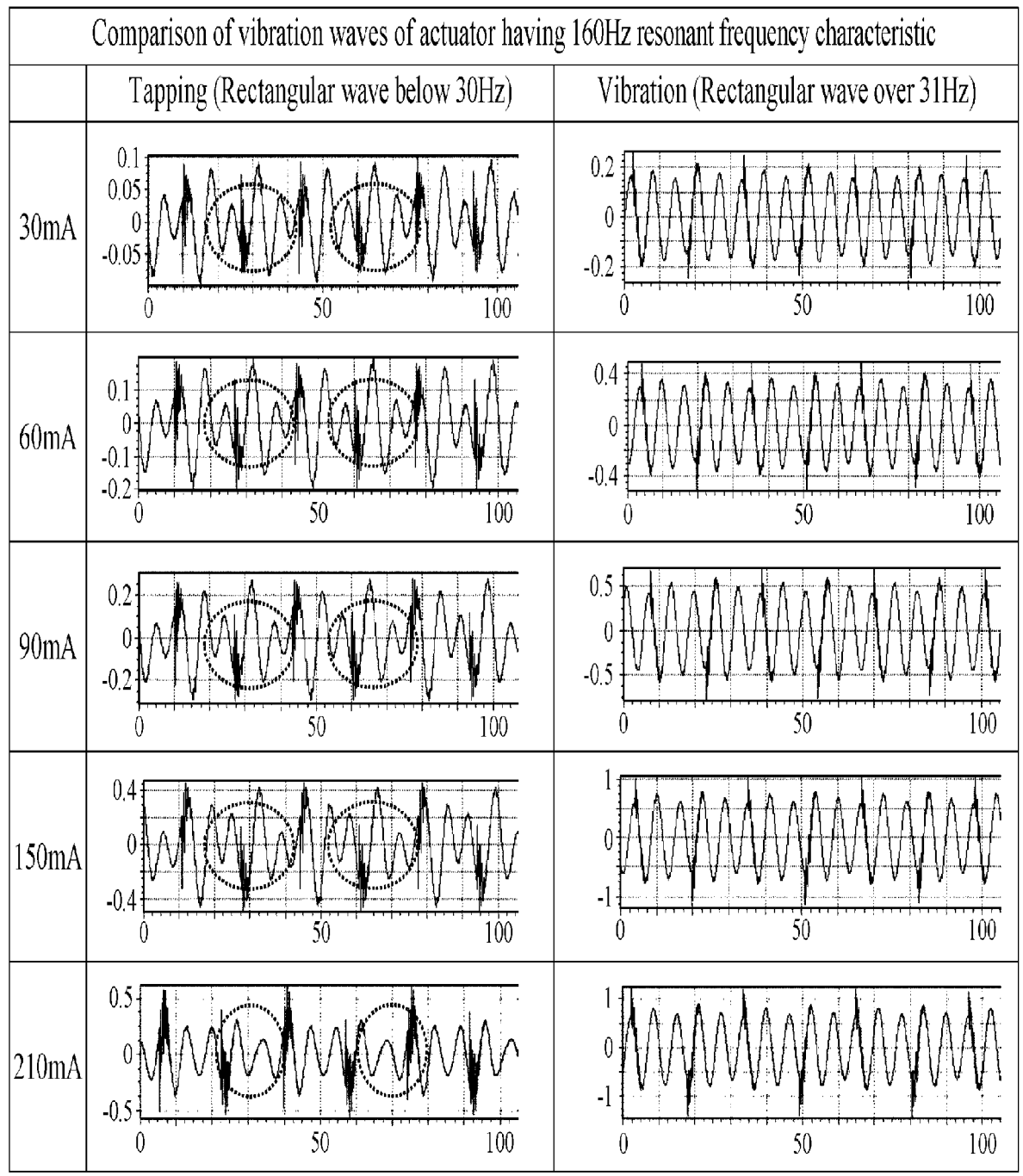
FIG. 29 illustrates waveforms of a vibrator exhibited in response to a change in a square wave electrical signal input into a tactile actuator having a resonant frequency characteristic of 160 Hz.
Figure 30:
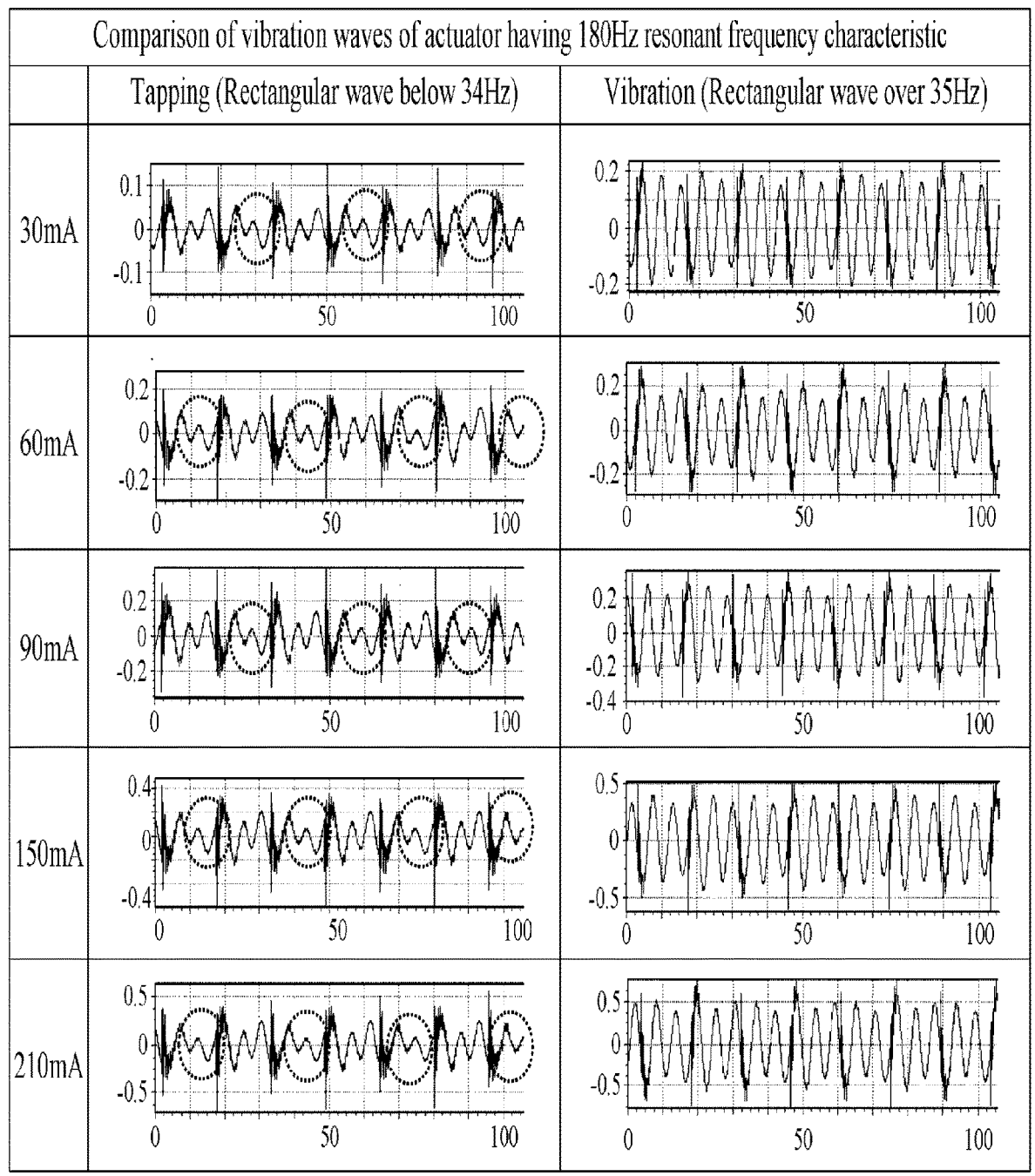
FIG. 30 illustrates waveforms of a vibrator exhibited in response to a change in a square wave electrical signal input into a tactile actuator having a resonant frequency characteristic of 180 Hz.

FIG. 25 is a graph illustrating a change in an acceleration with respect to a change in an intensity of a square wave input electrical signal of 5 hertz (Hz), in tactile actuators having different resonant frequencies, and FIG. 26 is a graph illustrating a change in an acceleration with respect to a change in a frequency of a square wave input electrical signal of 90 milliamperes (mA), in the tactile actuators having different resonant frequencies.

Through the experiments, it was learned that a user may feel a tactile sense of tapping when the vibrator 203 operates with an acceleration of 0.2 G. Referring to FIGS. 25 and 26, in a case in which the resonant frequency of the tactile actuator 200 is below 160 Hz, the vibrator 203 may operate with an acceleration over 0.2 G although an electrical signal with an intensity of 90 mA and a frequency of 5 Hz is applied. Conversely, in a case in which the resonant frequency of the tactile actuator is 180 Hz which is a bit greater than 160 Hz, an electrical signal over 130 mA which is about 1.5 times 90 mA may need to be applied such that the vibrator 203 may operate with an acceleration over 0.2 G.

In a case in which a mass of the vibrator 203 is below 2 g, the tactile actuator 200 may set an elasticity coefficient of the elastic member 204 to be below 2.021 N/mm, thereby setting the resonant frequency to be below 160 Hz. Meanwhile, in a case in which the mass of the vibrator 203 is over 2 g, the tactile actuator 200 may set the elasticity coefficient of the elastic member 204 to be over 2.021 N/mm, thereby setting the resonant frequency to be below 160 Hz.

Figure 31:
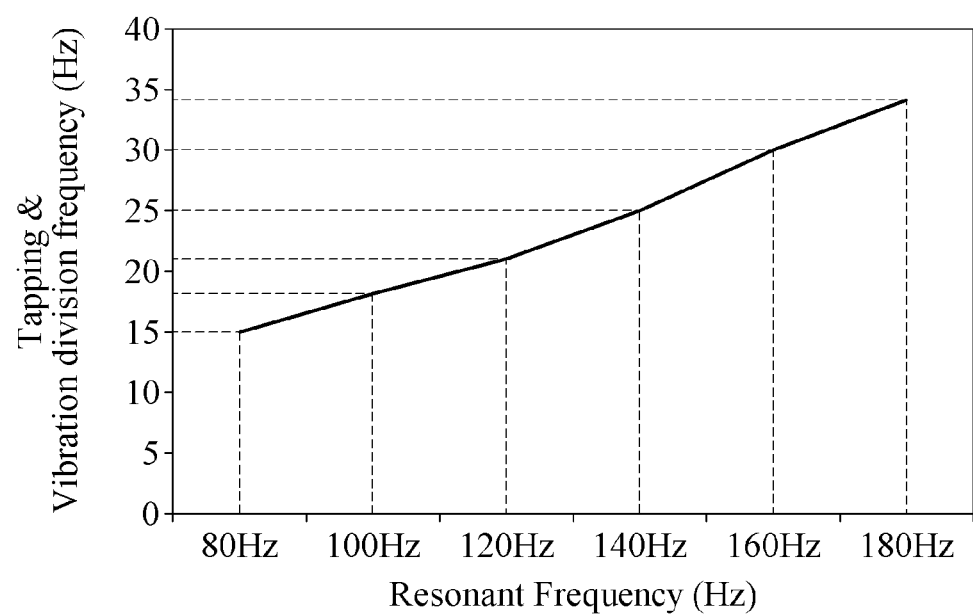
FIG. 31 is a graph illustrating threshold frequencies of tapping and vibration when a square wave electrical signal is applied, in tactile actuators having different resonant frequencies.
Figure 32:
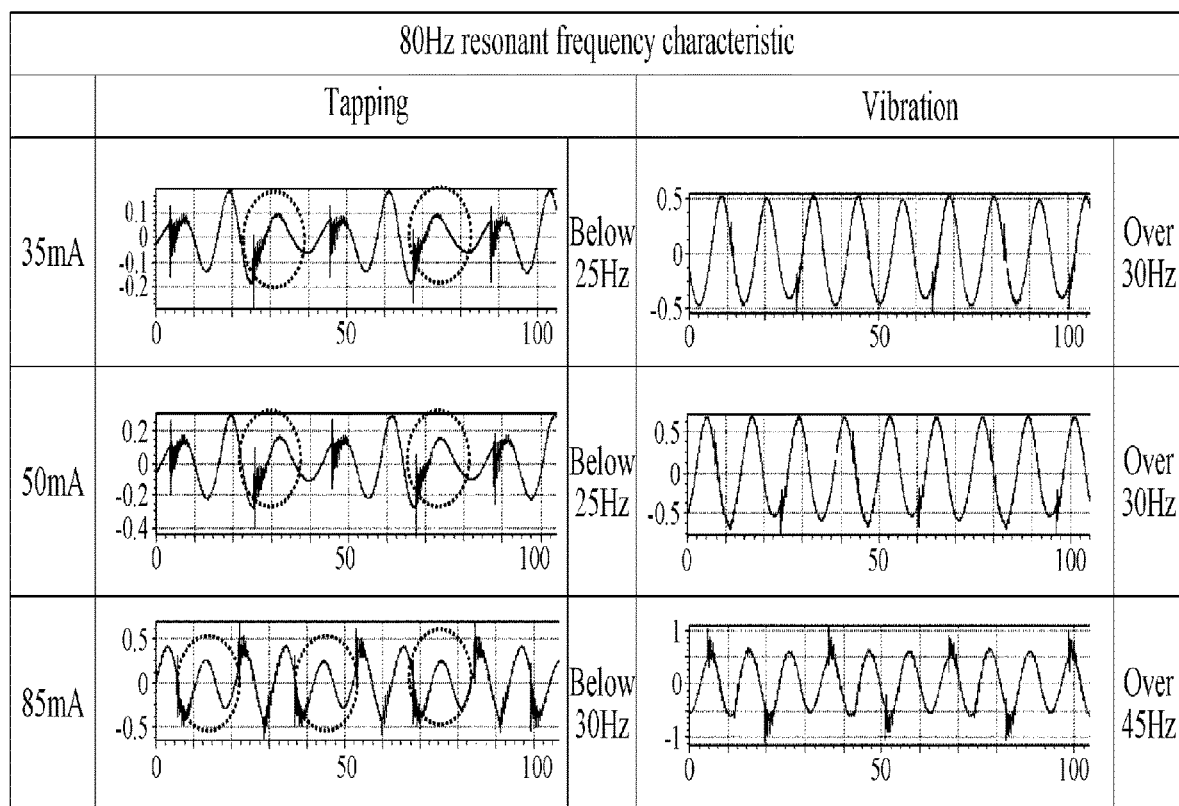
FIG. 32 illustrates waveforms of a vibrator exhibited in response to a change in a pulse wave electrical signal input into a tactile actuator having a resonant frequency characteristic of 80 Hz.
Figure 33:
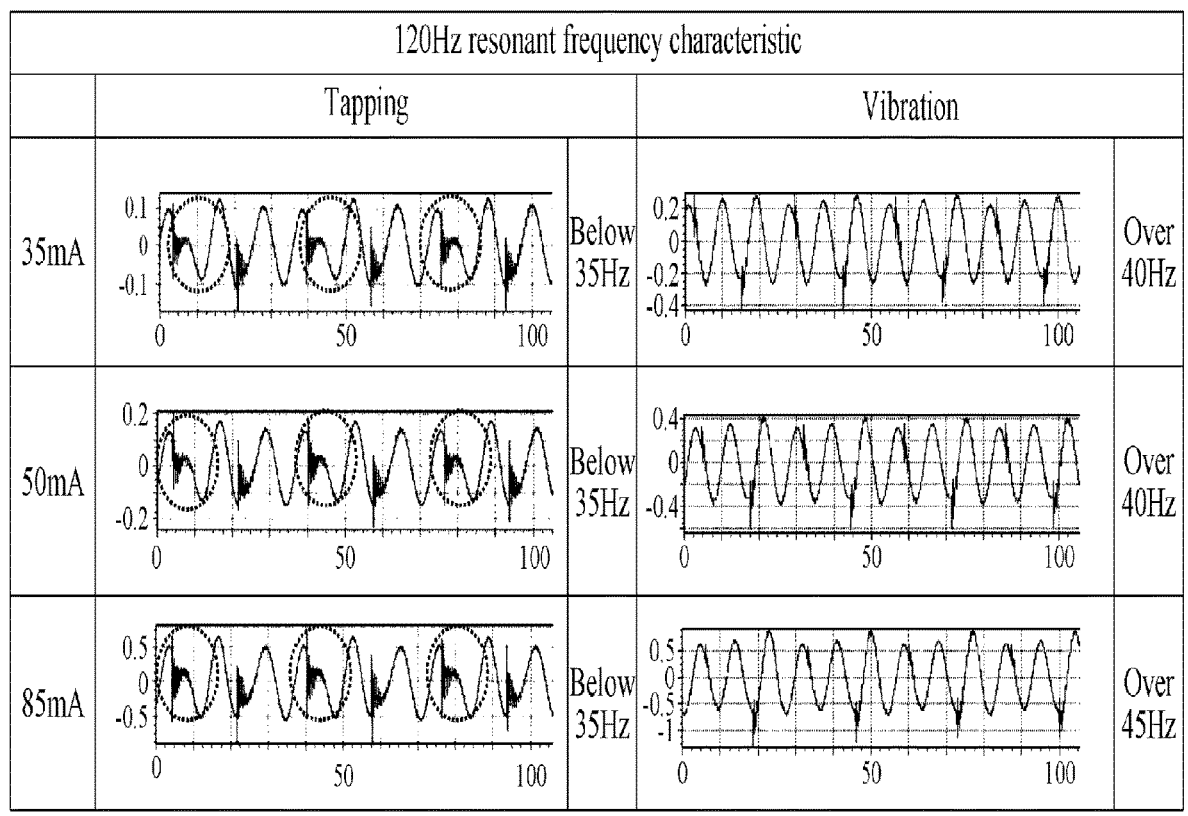
FIG. 33 illustrates waveforms of a vibrator exhibited in response to a change in a pulse wave electrical signal input into a tactile actuator having a resonant frequency characteristic of 120 Hz.
Figure 34:
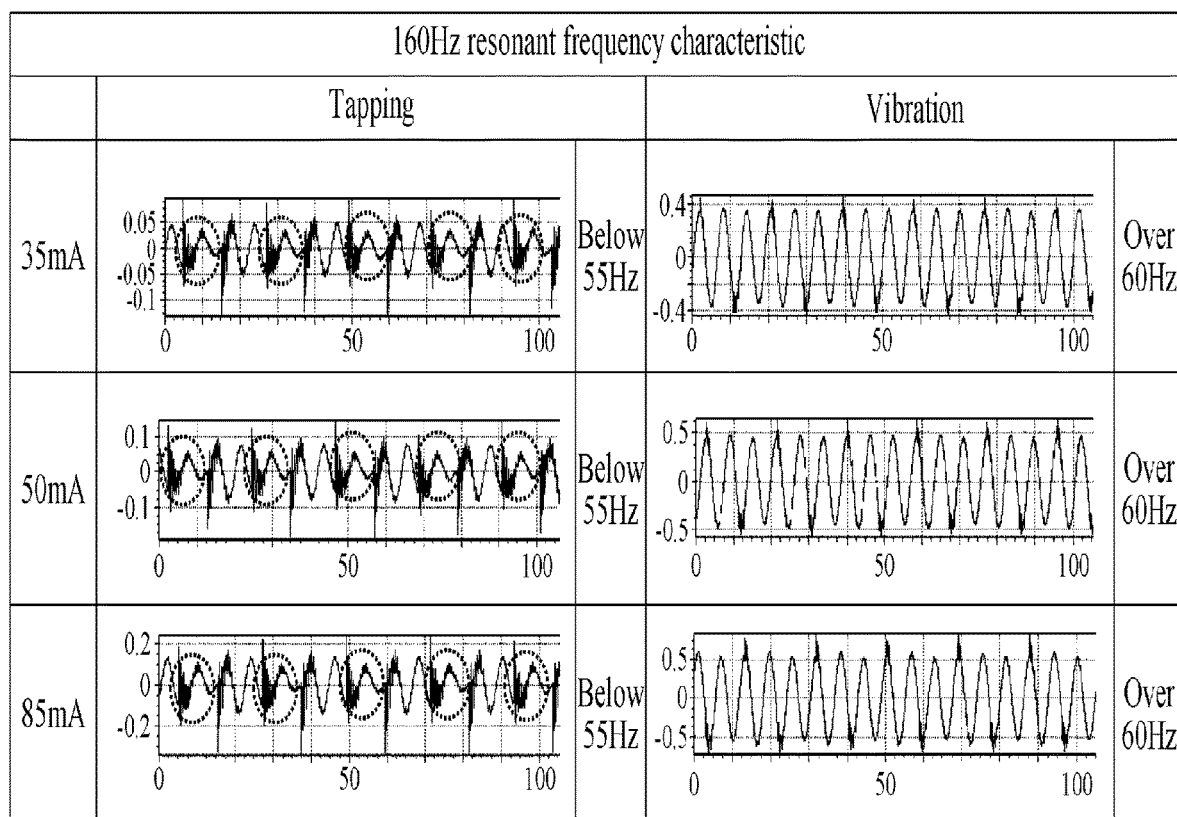
FIG. 34 illustrates waveforms of a vibrator exhibited in response to a change in a pulse wave electrical signal input into a tactile actuator having a resonant frequency characteristic of 160 Hz.
Figure 35:
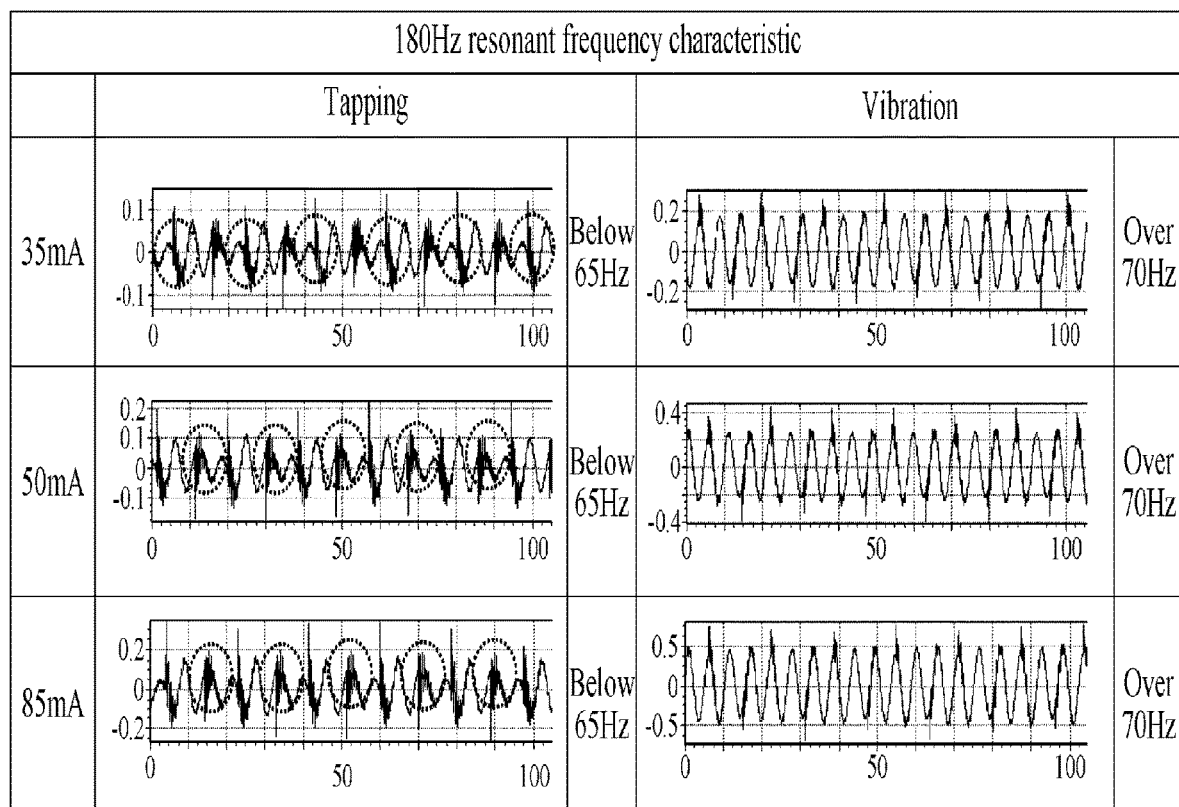
FIG. 35 illustrates waveforms of a vibrator exhibited in response to a change in a pulse wave electrical signal input into a tactile actuator having a resonant frequency characteristic of 180 Hz.

FIGS. 27 through 30 illustrate waveforms of vibrators exhibited in response to a change in a square wave electrical signal input into tactile actuators having resonant frequency characteristics of 80 Hz, 120 Hz, 160 Hz, and 180 Hz, respectively, and FIG. 31 is a graph illustrating threshold frequencies of tapping and vibration when a square wave electrical signal is applied, in the tactile actuators having different resonant frequencies.

Referring to FIGS. 27 through 30, when a square wave electrical signal over a predetermined frequency is applied, the vibrator 203 may form a vibration force of a shape of a sine wave which is a periodic waveform, as shown in the graphs in the right column of each drawing. Thus, under the above conditions, the tactile actuator may provide a tactile sense of "vibration" to the user.

Conversely, as shown in the graphs in the left column of each drawing, the vibrator 203 may not form a periodic vibration force in a region below the predetermined frequency, and the graphs partially collapse. However, due to a characteristic of the square wave, at each periodic instance at which the intensity of the electrical signal changes, an acceleration of the vibrator may change much greatly, when compared to other sections. Thus, under the above conditions, the tactile actuator 200 may provide a tactile sense of "tapping" to the user.

As described above, the tactile sense that the tactile actuator 200 provides to the user may be divided as vibration or tapping based on the predetermined frequency. The predetermined frequency may also be referred to as a threshold frequency or a division frequency.

Referring to FIGS. 27 through 30, as the resonant frequency of the tactile actuator 200 increases, the threshold frequency may also increase, which is shown in FIG. 31. In a control method for the tactile actuator 200, the first set frequency f_H and the second set frequency f_L may be set based on the threshold frequency of FIG. 31.

Figure 36:
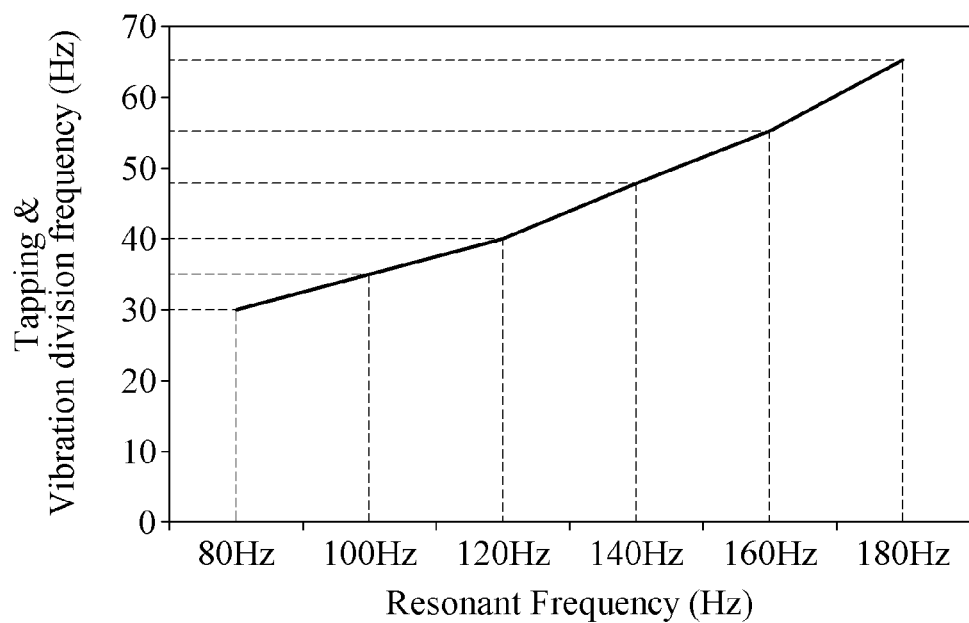
FIG. 36 is a graph illustrating threshold frequencies of tapping and vibration when a pulse wave electrical signal is applied, in tactile actuators having different resonant frequencies.
Figure 37:
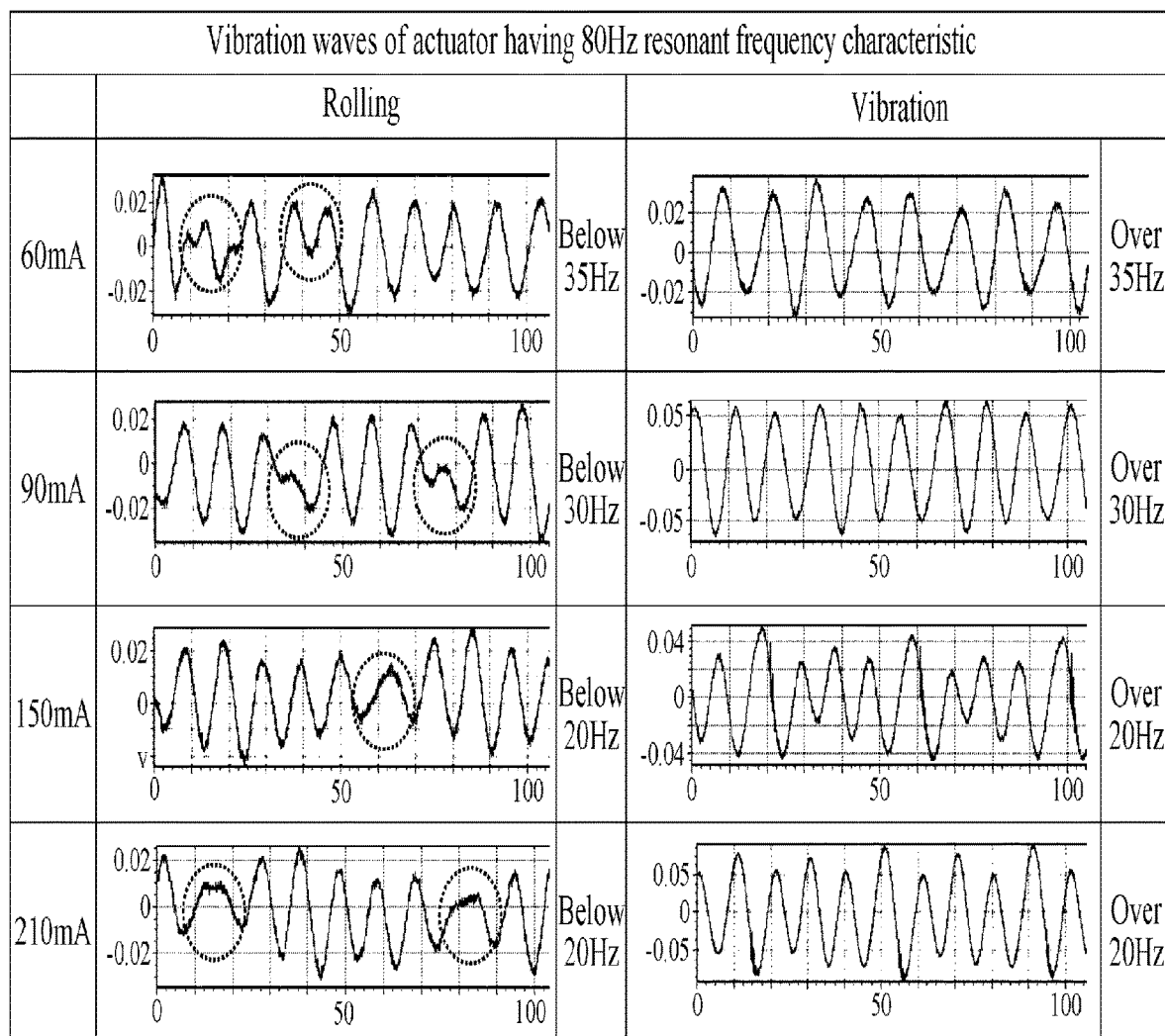
FIG. 37 illustrates waveforms of a vibrator exhibited in response to a change in a sine wave electrical signal input into a tactile actuator having a resonant frequency characteristic of 80 Hz.
Figure 38:
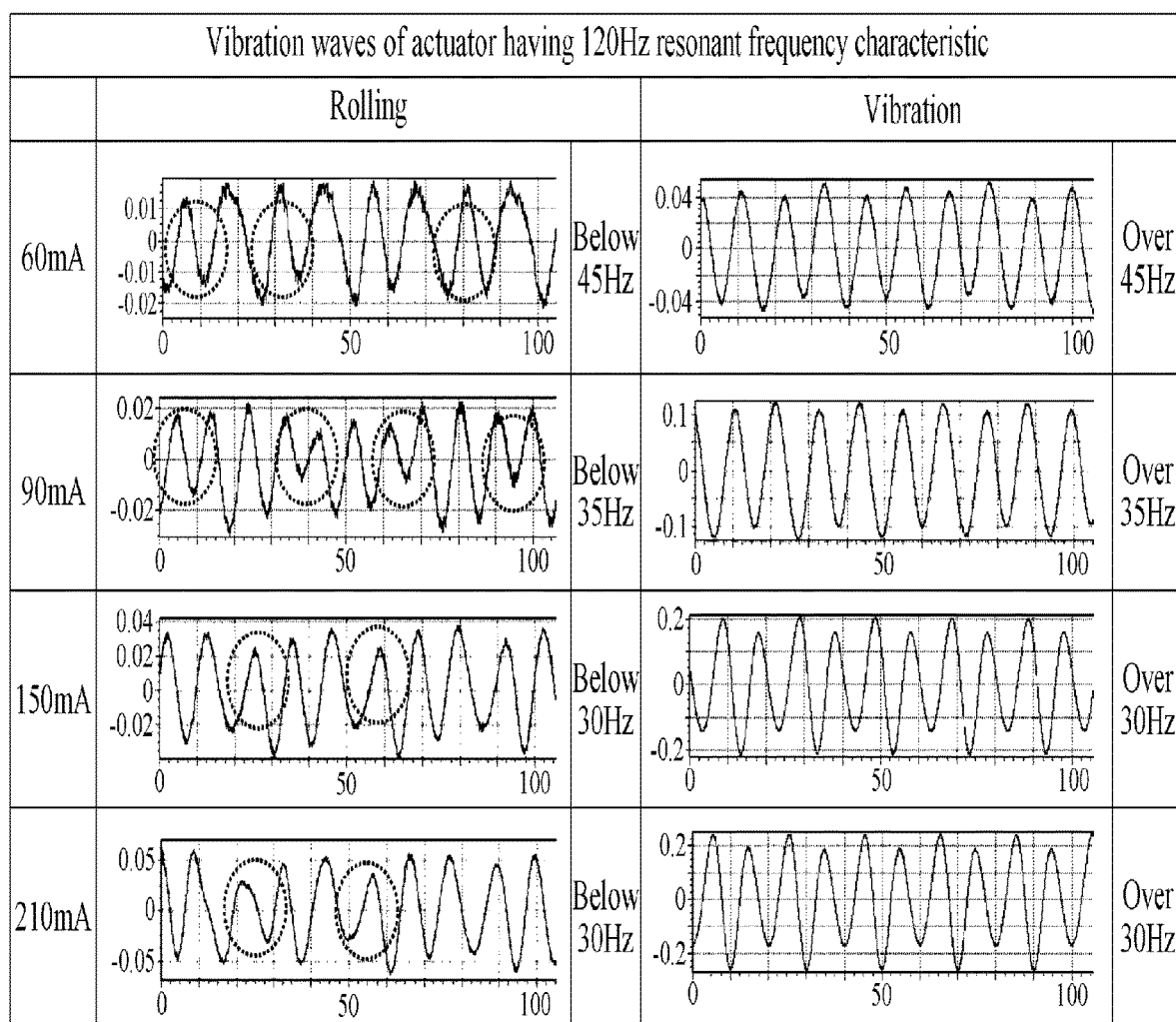
FIG. 38 illustrates waveforms of a vibrator exhibited in response to a change in a sine wave electrical signal input into a tactile actuator having a resonant frequency characteristic of 120 Hz.
Figure 39:
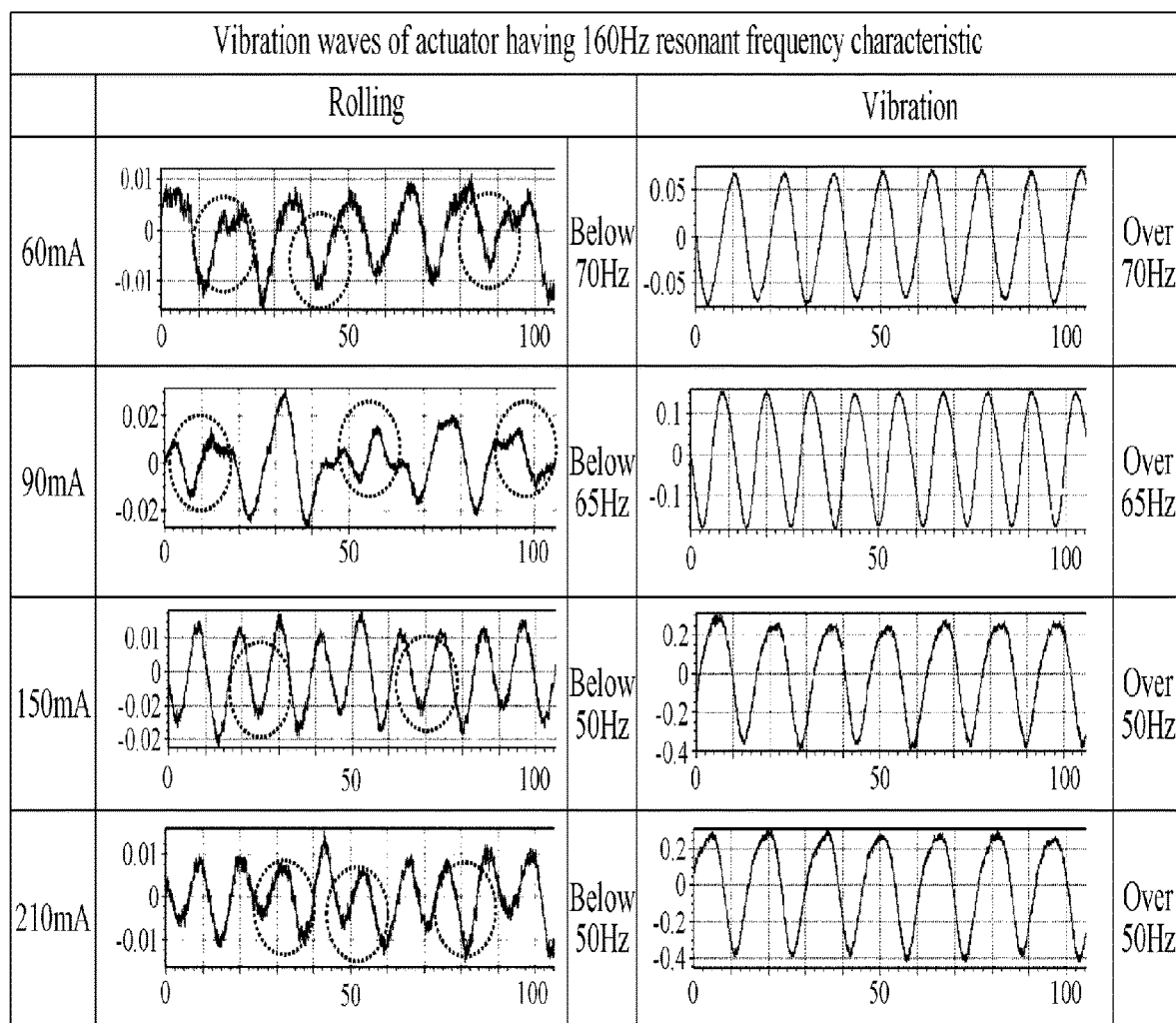
FIG. 39 illustrates waveforms of a vibrator exhibited in response to a change in a sine wave electrical signal input into a tactile actuator having a resonant frequency characteristic of 160 Hz.
Figure 40:
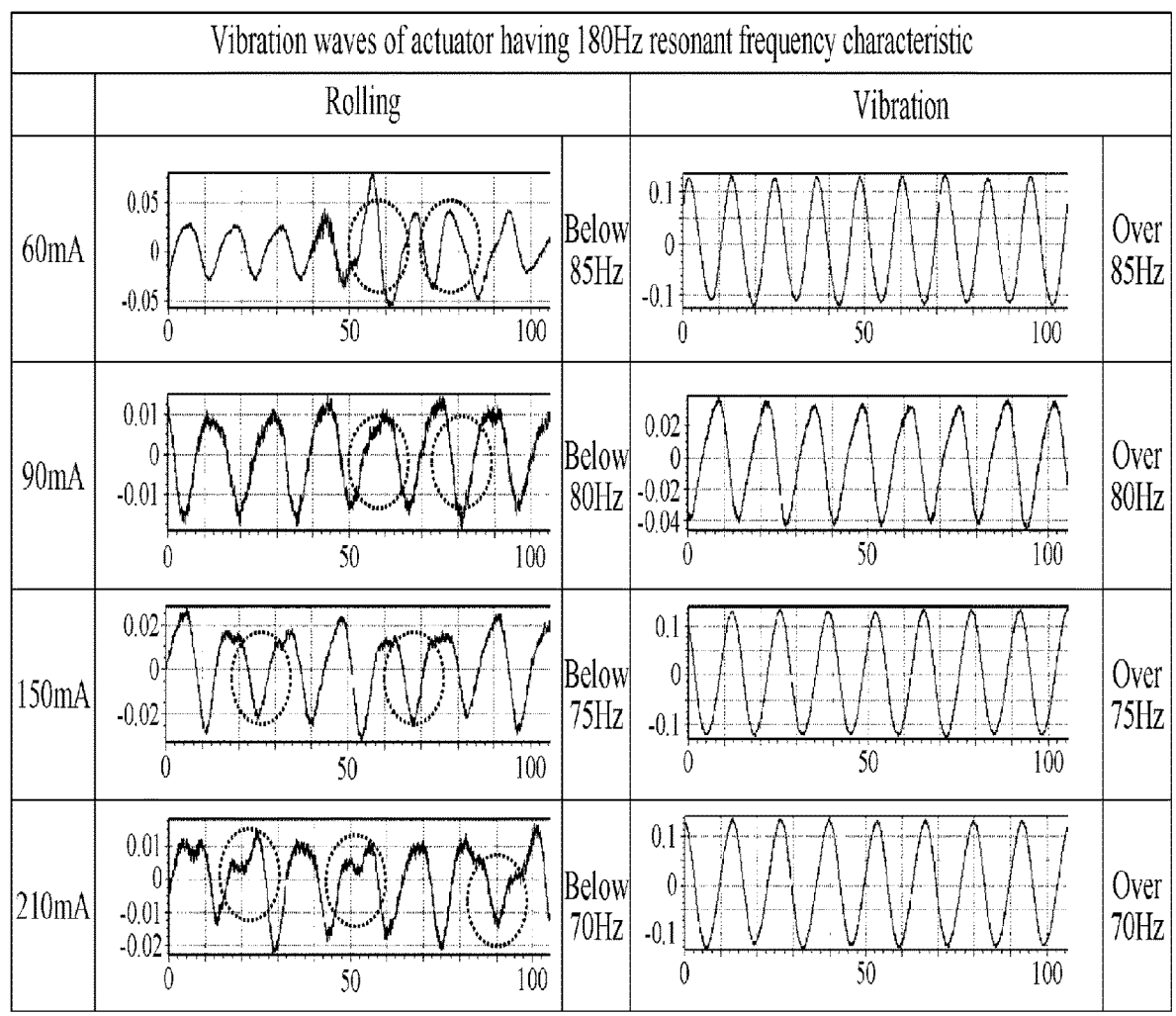
FIG. 40 illustrates waveforms of a vibrator exhibited in response to a change in a sine wave electrical signal input into a tactile actuator having a resonant frequency characteristic of 180 Hz.

FIGS. 32 through 35 illustrate waveforms of vibrators exhibited in response to a change in a pulse wave electrical signal input into tactile actuators having resonant frequency characteristics of 80 Hz, 120 Hz, 160 Hz, and 180 Hz, respectively, and FIG. 36 is a graph illustrating threshold frequencies of tapping and vibration when a pulse wave electrical signal is applied, in the tactile actuators having different resonant frequencies.

Referring to FIGS. 32 through 35, when a pulse wave electrical signal is input, a vibrator may have a similar waveform to a case in which a square wave electrical signal is input. Thus, when a pulse wave electrical signal below a threshold frequency is applied to the tactile actuator, the tactile actuator may provide a tactile sense of "tapping" to the user. When a pulse wave electrical signal over the threshold frequency is applied to the tactile actuator, the tactile actuator may provide a tactile sense of "vibration" to the user.

Referring to FIGS. 32 through 35, as the resonant frequency of the tactile actuator increases, the threshold frequency may also increase, which is shown in FIG. 36.

Meanwhile, with respect to the tactile actuator having the same resonant frequency, a threshold frequency when inputting a pulse wave electrical signal may be about two times a threshold frequency when inputting a square wave electrical signal.

In a control method for the tactile actuator, the first set frequency f_H and the second set frequency f_L may be set based on the threshold frequency of FIG. 36.

Figure 41:
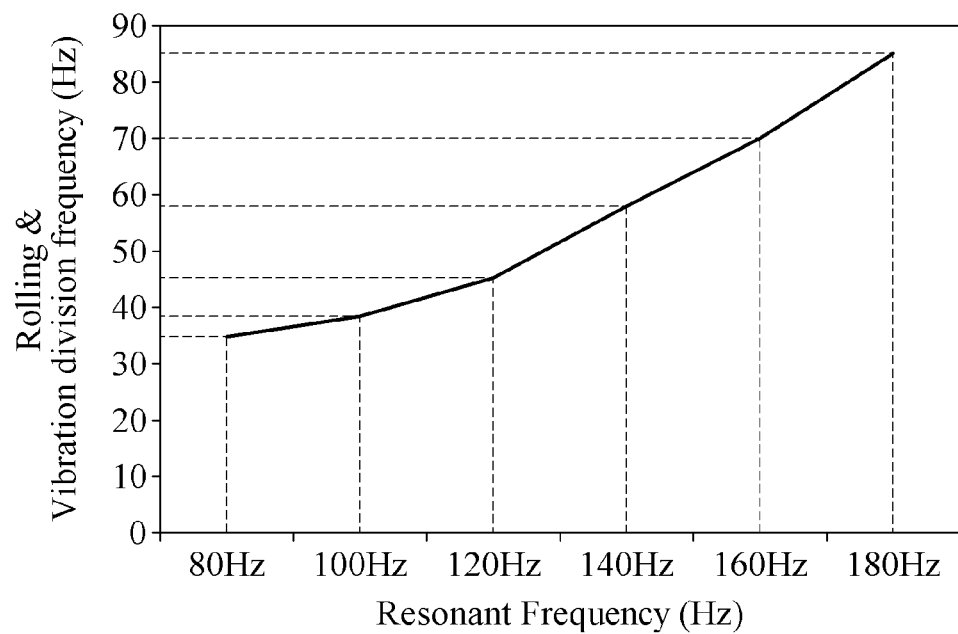
FIG. 41 is a graph illustrating threshold frequencies of rolling and vibration when a sine wave electrical signal is applied, in tactile actuators having different resonant frequencies.

FIGS. 37 through 40 illustrate waveforms of vibrators exhibited in response to a change in a sine wave electrical signal input into tactile actuators having resonant frequency characteristics of 80 Hz, 120 Hz, 160 Hz, and 180 Hz, respectively, and FIG. 41 is a graph illustrating threshold frequencies of rolling and vibration when a sine wave electrical signal is applied, in the tactile actuators having different resonant frequencies.

Referring to FIGS. 37 through 40, when a sine wave electrical signal over a predetermined frequency is applied, a vibrator may form a vibration force of a shape of a sine wave which is a periodic waveform, as shown in the graphs in the right column of each drawing. Thus, under the above conditions, the tactile actuator may provide a tactile sense of "vibration" to the user.

Conversely, as shown in the graphs in the left column of each drawing, the vibrator may not form a periodic vibration force in a region below the predetermined frequency, and the graphs partially collapse. The vibrator not forming a periodic vibration force may have an acceleration of a vertical motion aperiodically. Meanwhile, due to a characteristic of the sine wave, an intensity of the electrical signal may change gently, and thus the user may feel a tactile sense of "rolling" through the above motion.

As described above, the tactile sense that the tactile actuator provides to the user may be divided as vibration or rolling based on the predetermined frequency.

Referring to FIGS. 37 through 40, as the resonant frequency of the tactile actuator increases, the threshold frequency may also increase, which is shown in FIG. 41. In a control method for the tactile actuator, the first set frequency f_H and the second set frequency f_L may be set based on the threshold frequency of FIG. 41.

Figure 42:
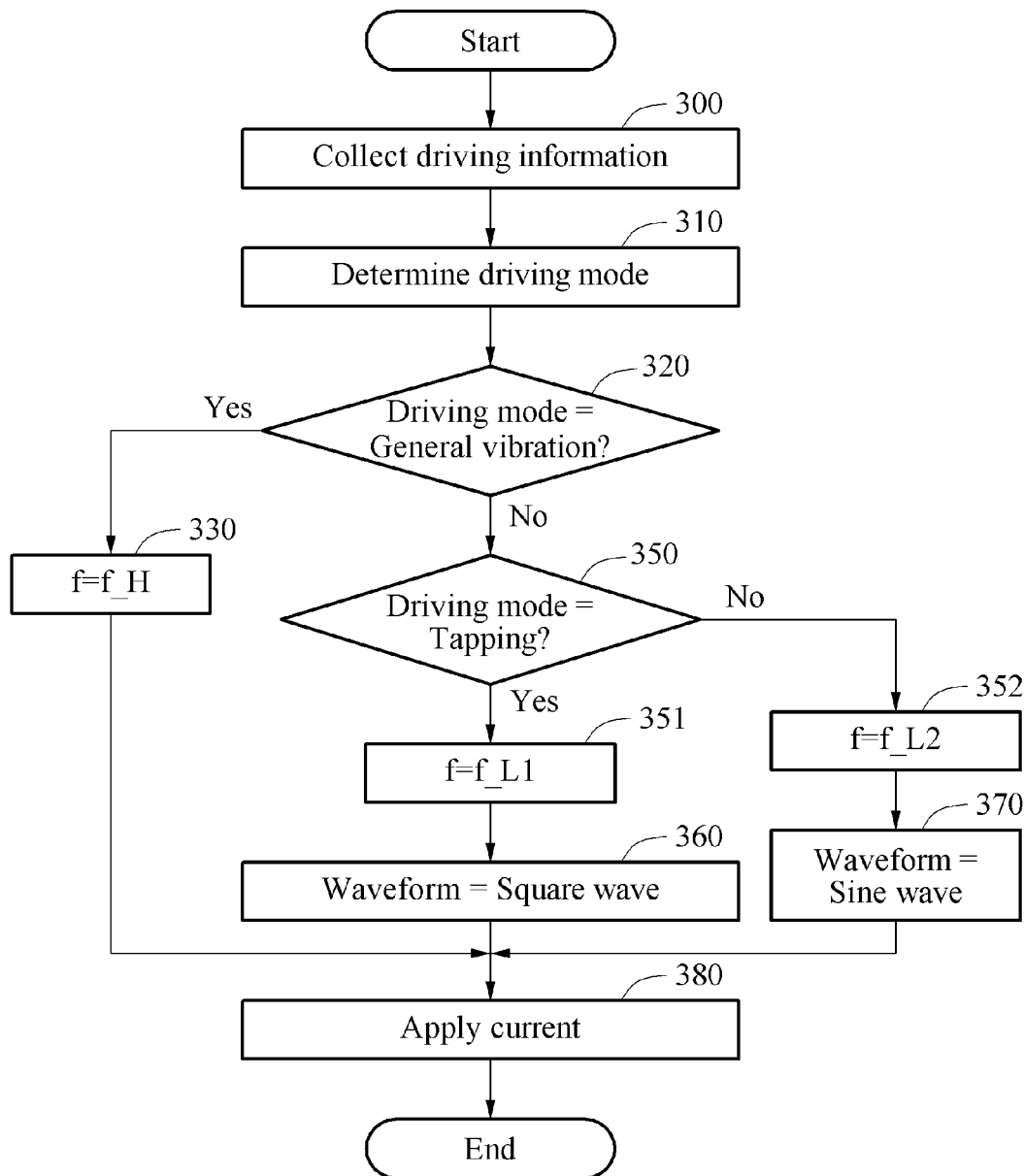
FIG. 42 illustrates a control method for a tactile actuator according to another embodiment.

FIG. 42 illustrates a control method for a tactile actuator according to another embodiment. Unless otherwise disclosed, the description of the control method for the tactile actuator provided with reference to FIG. 22 may also apply to the other embodiment.

Referring to FIG. 42, in a control method for the tactile actuator 200, when a driving mode is a general vibration mode in operation 320, the controller 20 may determine a frequency of an electrical signal to be applied to be a first set frequency f_H. With reference to FIG. 31, 36, or 41, the first set frequency f_H may be set to be a value greater than a first threshold frequency which is a minimum frequency to provide a tactile sense of "vibration" under provide conditions.

When the driving mode is not the general vibration mode in operation 320, the controller 20 may determine whether the driving mode is a tapping mode, in operation 350.

In a case in which the driving mode is the tapping mode in operation 350, the controller may determine the frequency of the electrical signal to be applied to be a second set frequency f_L1, in operation 351. With reference to FIG. 31 or 36, the second set frequency f_L1 may be set to be a value less than a second threshold frequency which is a maximum frequency to provide a tactile sense of "tapping" under provided conditions.

In a case in which the driving mode is not the tapping mode in operation 350, the controller 20 may determine the frequency of the electrical signal to be applied to be a third set frequency f_L2, in operation 352. With reference to FIG. 41, the third set frequency f_L2 may be set to be a value less than a third threshold frequency which is a maximum frequency to provide a tactile sense of "rolling" under provided conditions.

Meanwhile, as shown in FIGS. 31, 36, and 41, the third threshold frequency which is a maximum frequency to provide a tactile sense of "rolling" may be greater than the second threshold frequency which is a maximum frequency to provide a tactile sense of "tapping" under the same conditions. Thus, the third set frequency f_L2 may be set to be higher than the second set frequency f_L1. Meanwhile, the first set frequency f_H may be set to be a value greater than the second set frequency f_L1 and the third set frequency f_L2. That is, the third set frequency f_L2 may be greater than the second set frequency f_L1, and the first set frequency f_H may be greater than the third set frequency f_L2.

FIG. 43 illustrates driving modes in which a tactile actuator operates based on types of dynamic markings according to an embodiment.

Referring to FIG. 43, the controller 20 of the haptic device 1 may interpret a meaning of a dynamic marking of acoustic information, and control a driving mode of the driver 30 based on a type of the dynamic marking.

For example, in a case in which the dynamic marking is a forte-type marking, the controller 20 may operate the tactile actuator 200 in a general vibration mode. Meanwhile, in a case in which the dynamic marking is a piano-type marking, the controller 20 may operate the tactile actuator 200 in a tapping mode or a rolling mode. However, the embodiments are note limited thereto. A point to switch the driving mode based on the dynamic marking may be set by a user at random. Any example of providing a different driving mode based on whether a dynamic marking is present and a type of the dynamic marking should be construed as falling within the scope of the present invention.

By the above configuration, the user may be provided with a different tactile sense based on whether a dynamic marking is present and a type of the dynamic marking, thereby recognizing a change in the acoustic information through the tactile sense.

Meanwhile, a case in which a criterion to distinguish a driving mode is a dynamic marking is exemplarily suggested above. However, the driving mode may also be set differently based on a different type of acoustic information. For example, the controller 20 may interpret a meaning of a slur of the acoustic information, and operate the tactile actuator 200 in the rolling mode in a section in which notes are linked by the slur. Thus, a musical feeling of softly slurring the notes linked by the slur may be expressed as a tactile sense.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A method of generating a tactile signal using a haptic device, the haptic device comprising:
   a database configured to store acoustic information or receive acoustic information from an external device;
   a controller configured to convert the acoustic information into an electrical signal corresponding to a predetermined pattern; and
   a tactile actuator configured to provide a user with a tactile signal,
   and the method comprising:
   collecting driving information, the driving information including the acoustic information;
   determining one of a plurality of preset driving modes based on the collected driving information;
   determining the electrical signal to have a frequency corresponding to the determined driving mode; and
   applying the electrical signal to the tactile actuator,
   wherein the step of determining one of the plurality of preset driving modes comprises:
   interpreting details of the acoustic information including at least one of duration information, pitch information and loudness information.

2. The method of claim 1, further comprising:
   determining a waveform of the electrical signal to be applied to the tactile actuator based on the determined driving mode.

3. The method of claim 1,
   wherein the collected driving information includes at least one of duration information of a sound, pitch information of the sound, whether a dynamic marking is present, and a type of the dynamic marking, and
   the determining of the driving mode comprises determining the apply time of the electrical signal based on the duration information of the sound, determining the intensity of the electrical signal based on the pitch information of the sound, determining the driving mode based on whether a dynamic marking is present, whether the dynamic marking is a forte-type marking, or whether the dynamic marking is a piano-type marking.

4. The method of claim 1, further comprising:
wherein the tactile signal is a signal that includes at least one of a plurality of frequencies, a plurality of amplitudes, and a plurality of durations.

5. The method of claim 1, further comprising:
determining an intensity of the electrical signal to be applied to the tactile actuator based on the determined driving mode.

6. The method of claim 1, further comprising:
determining an apply time of the electrical signal to be applied to the tactile actuator based on the determined driving mode.

* * * * *